United States Patent
Shiraishi et al.

(10) Patent No.: US 6,239,965 B1
(45) Date of Patent: May 29, 2001

(54) ELECTROLYTIC CAPACITOR AND METHOD OF PRODUCING THE SAME

(75) Inventors: Seigo Shiraishi, Hirakata; Emiko Igaki, Amagasaki; Masakazu Tanahashi, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/317,209

(22) Filed: May 24, 1999

(30) Foreign Application Priority Data

May 22, 1998 (JP) .................................. 10-140952

(51) Int. Cl.[7] .............................. H01G 9/04; H01G 4/32
(52) U.S. Cl. ...................... 361/511; 361/508; 361/516; 361/522
(58) Field of Search ...................... 361/508, 509, 361/511, 516, 528, 529, 532

(56) References Cited

U.S. PATENT DOCUMENTS 4,805,074 * 2/1989 Harakawa et al. .................... 361/525
5,586,000 12/1996 Sakata et al. ......................... 361/525

FOREIGN PATENT DOCUMENTS 63-239917    10/1988    (JP) .
2-224316      9/1990    (JP) .
6-168855  *   6/1994    (JP) .

* cited by examiner

Primary Examiner—Anthony Dinkins
(74) Attorney, Agent, or Firm—Wenderoth, Lind & Ponack, L.L.P.

(57) ABSTRACT

The present invention provides an electrolytic capacitor having a large capacitance sufficiently close to its design capacitance, and a method of easily producing such an electrolytic capacitor. In this method, a cathode-side conductive polymer layer or a electrolyzing electrode is formed on at least one side surface of an anode valve metal foil having through holes 20 and a coarsened surface, electrolysis is carried out in a conductive monomer solution, with the polymer layer used as the anode, and an electrolytically-formed conductive polymer layer is formed on the surface of the dielectric oxide film of the valve metal foil, thereby obtaining an electrolytic capacitor. As a result, it is possible to easily obtain an electrolytic capacitor having a large capacitance sufficiently close to its design capacitance.

10 Claims, 14 Drawing Sheets

ELECTROLYTIC CAPACITOR AND METHOD OF PRODUCING THE SAME

BACKGROUND OF THE INVENTION

1. Field of the Invention

The present invention relates to an electrolytic capacitor comprising an anode of a valve metal such as aluminum or tantalum, and a cathode of a conductive polymer layer, and also relates to a method of producing such an electrolytic capacitor.

2. Prior Art

A conventional electrolytic capacitor have been composed of an anode formed of the valve metal, a dielectric layer formed of a film of the valve metal oxide, and a cathode formed of a liquid electrolyte or inorganic solid electrolyte, with leads connected to the anode and the cathode, respectively, being packaged to make a product.

The anode is made of aluminum or tantalum as the valve metal, whose oxide metal is used for the dielectric layer. In the case of aluminum electrolytic capacitor, the surface of an aluminum foil is coarsened and anodized to form the oxide film,, thereby obtaining an aluminum anode element. In the case of a tantalum electrolytic capacitor, a compact made of powdered tantalum is fired in a oxidizing atmosphere, to obtain a tantalum anode element.

Conventionally, as a cathode, the organic solvent including an organic acid or the like have been used in the case of the aluminum electrolytic capacitor. The solid electrolyte was, for example, manganese dioxide in the case of a tantalum electrolytic capacitor.

In these days, electronic components have been requested to have excellent high-frequency response property, particularly, to be adaptable to digital circuits, so that electrolytic capacitors are also required to have excellent high-frequency response and lower inner resistance. In order to meet these market needs, some conductive polymers having a high conductivity have been examined and developed for use in the solid electrolytic cathode of such electrolytic capacitors.

In the electrolytic capacitor wherein the solid electrolyte is formed of a conductive polymer, the conductive polymer layer is formed on the anode element to make direct contact to the entire dielectric layer of the oxide film on the valve metal.

The electrolytic capacitor using such a conductive polymer layer is known, for example, in the Japanese Patent Publication JP-A 6-168855.

The chemical polymerization technique have been known, which forms the conductive polymer on an anode elements into a cathode. In this technique, the anode element is immersed in a monomer solution, and the monomer is polymerized at the presence of an oxidizing agent as a polymerizing initiator. As a result, a conductive polymer layer is formed on the oxide film on the surface of the anode.

The electrolytic polymerization technique have also been known for polymerizing, wherein polymerization is performed by anodizing a conductive monomer on the surface of a solid film to have polymerized as the electrolyzing electrode. According to this technique, a first conductive layer, having slight conductivity, must be formed on a dielectric oxide film. This first conductive layer on the anode element is used a start point for further polymerizing electrolytically. For this first conductive layer is used a manganese dioxide film previously attached to the oxide film, or a very thin conductive polymer layer previously formed by the above chemical polymerization technique.

However, the formation of the conductive polymer layer by the conventional techniques caused some problems. It was difficult to grow a conductive polymer layer having a uniform and sufficient thickness on the entire surface of the dielectric layer of the oxide film. For this reason, the electrolytic capacitor obtained as the final product could not show capacitance high enough to be estimated from the anode film design. Furthermore, in the prior art chemical polymerization technique, the polymerizing operations had to be repeated several tens of times to increase the thickness of the grown polymer, in order to obtain the sufficiently high capacitance.

In the case of using the conventional electrolytic polymerization technique, the first conductive layer is formed of a manganese dioxide or a very thin conductive polymer layer formed by the chemical polymerization technique. Therefore, electric current supplied for electrolysis flows through the first conductive layer having a relatively high electric resistance. For this reason, a relatively long polymerization period of time was required to form the conductive polymer layer on the entire surface of the dielectric layer.

Conventionally, to electrolytically form a conductive polymer layer on both sides of an anode valve metal foil, polymerization had carried out, starting from a part of one side of the anode valve metal foil, and then advancing to the opposite side through roundabout routes. In this conventional method, when a conductive polymer layer is formed by electrolytic polymerization on both sides of an anode foil having a relatively large area, it takes a long time for polymerization. In addition, the thickness of the conductive polymer layer at the starting point for polymerizing differs from that at the ending point. This difference in thickness of the conductive polymer layer is caused by the total polymerizing period of time different at the start point and the end point. Therefore, to obtain a conductive polymer layer having a more relatively uniform thickness, the speed of polymerization is required to be made slower, then reducing the difference in polymerization time. This results in extending the operating time for polymerization.

For these reasons, the above technique, not to have formed a conductive polymer layer uniformly on a wide anode foil, was limited to only on a relatively narrow anode foil which is suited for the shape of the final product, just as in the example of the Japanese Patent Publication JP-A 63-239917.

In order to form a necessary and sufficient conductive polymer layer for the final product, the processes for capacitor production have been complicated and taken a long time, then, requiring high production cost.

SUMMARY OF THE INVENTION

An object of the present invention is to provide an electrolytic capacitor having a conductive polymer layer formed uniformly and simply in direct contact to the entire surface of a dielectric layer of the oxide film, obtaining a capacitance high enough to be estimated from its anode element design.

Another object of the present invention is to provide an electrolytic capacitor being small in size and large in capacitance.

A further object of the present invention is to provide a method of producing an electrolytic capacitor having a conductive polymer layer formed uniformly and simply with direct contact to the entire surface of a dielectric oxide film.

A still further object of the present invention is to provide a method of producing an electrolytic capacitor having a capacitance high enough to be estimated from its anode element design and being small in size and large in capacitance.

The electrolytic capacitor of the present invention comprises an anode layer of a valve metal foil having through holes and a coarsened surface of the valve metal foil, a dielectric layer of a oxide film formed on a part of the surface, and a cathode layer of a conductive polymer, wherein the cathode layer is an electrolytically-formed conductive polymer layer formed to make contact with the dielectric layer.

Furthermore, the cathode layer may comprise a cathode-side conductive polymer layer disposed on at least one side surface of the valve metal foil. In this case the electrolytically-formed conductive polymer layer is formed on the dielectric layer and electrically connected to the cathode-side conductive polymer layer.

Particularly, the electrolytic capacitor may comprises an electric collector, which is a metal sheet, formed on the cathode-side conductive polymer layer formed on one side of the valve metal foil. The electric collector is used to connect to a cathode lead.

The present invention includes the method of producing an electrolytic capacitor comprising an anode layer formed of a valve metal foil having through holes and a coarsened surface, a dielectric layer of a oxide film formed by anodizing a part of the surface thereof and a cathode layer of a conductive polymer layer.

The method uses an electrolytic polymerization process in which a monomer solution is electrolyzed between a electrolyzing electrode formed on the valve metal foil and another electrolyzing electrode in the monomer solution, to produce a electrolytically-formed conductive polymer layer formed on the surface of the dielectric layer on the valve metal foil, the electrolytically-formed conductive polymer being used as a cathode layer.

Particularly, the method comprises steps of: forming a electrolyzing electrode on one side surface of the valve metal foil; immersing the valve metal foil in a conductive monomer solution, another electrode being disposed in the solution on the other side of the electrolyzing electrode to the valve metal foil; and, polymerizing the monomer by electrolyzing the monomer between the electrolyzing electrode and said another electrode, to form a electrolytically-formed conductive polymer layer, as a cathode layer, which is attached on the surface of the oxide film on the valve metal foil.

In the polymerizing step the monomer is polymerized by electrolytically oxidative polymerization during flowing electric current between the electrolyzing electrode, as positive electrode, on the valve metal foil, and other electrode, as negative electrode, disposed in the solution, then precipitating a conductive polymer layer in uniform thickness on the surface of the dielectric layer.

In this electrolytic polymerization process, the polymerizing of the monomer starts on the surface of the electrolyzing electrode, which is attached to the valve metal foil immersed in the monomer solution and is used as the anode for electrolysis. The polymer, occurring first on the electrode, grows continuously, passes through the through holes in the vale metal foil, spreads on the opposite surface thereof, and covers the entire surface of the metal foil immersed in the solution, to form a conductive polymer layer.

The conductive polymer layer formed by electrolysis makes contact to the dielectric layer on the metal foil, which is used for the cathode layer.

The method of the present invention may use an electrolyzing metal sheet or conductive polymer film or a combination of both the electrolyzing metal sheet and the conductive polymer film for the electrolyzing electrode. After polymerizing, the electrolyzing electrode, particularly, a single metal sheet or foil, may be removed.

However, in the method, the electrolyzing electrode may be a conductive polymer layer (referred to as cathode-side conductive polymer layer) is formed on the anode valve metal foil. Prior to polymerizing step, the cathode-side conductive polymer layer is attached on the anode layer, and after the electrolytically polymerizing step, the cathode-side conductive polymer layer, remaining together with the electrolytically-formed conductive polymer layer may used as a cathode layer of the capacitor.

Particularly, the electrolyzing electrode may comprise said cathode-side conductive polymer layer on the anode layer, and a metal sheet (an electrolyzing metal sheet) attached to the cathode-side conductive polymer layer. After electrolytic polymerization, the electrolytically-formed conductive polymer layer and the cathode-side conductive polymer layer may be used as a cathode layer of the capacitor, the metal sheet being used as a cathode electric collector.

In the electrolytic polymerization method of the present invention, the conductivity of the cathode-side conductive polymer layer can be raised, the current for electrolysis can be made large, the speed of forming the conductive polymer layer can be increased, and the formation of the conductive polymer layer can be made easier, regardless of whether the start point of electrolytic polymerization is the metal foil, the cathode-side conductive polymer layer or the cathode-side conductive polymer layer provided on the cathode electric collector. Furthermore, in the electrolytic polymerization method according to the present invention, the polymer passes through the through holes in the metal foil and is formed simultaneously in the thickness direction of the anode valve metal foil. Therefore, the polymer can cover the surface of the metal foil immersed in the solution quickly and uniformly, regardless of the size of the valve metal foil. As a result, the conductive polymer layer can be formed quickly and easily as described above. It is therefore possible to obtain an electrolytic capacitor capable of delivering a large capacitance sufficiently close to its design capacitance.

The method of the present invention, prior to the polymerizing step, comprises a further step of forming a conductive layer which is preformed as part of a cathode layer in contact to a part of or all the surface area of the dielectric layer. In polymerizing, so preformed a conductive layer makes contact to the growing polymer layer and becomes anodic starting points for polymerizing the monomer. Thus, it can promote the polymerizing rate in the growing direction of electrolytic polymerization to extend a area of the polymer on the dielectric layer of the valve metal foil and also to increase a thickness of the polymer.

The conductive layer on the dielectric layer may be a conductive polymer film, particularly chemically polymerized, or a oxide film such as manganese dioxide.

The presence of this conductive layer facilitates the formation of the electrolytically-formed conductive polymer layer by electrolytic polymerization. The dielectric layer can thus be covered completely with the formed electrolytically-formed conductive polymer layer.

The present invention includes a laminated or wound electrolytic capacitor fabricated of plurality of the above-mentioned electrolytic capacitors.

The laminate is provided with an anode lead electrically connected to the anode valve metal foils, and a cathode lead electrically connected to the cathode-side conductive polymer layers or cathode electric collectors. Since the plural capacitor units, each being capable of delivering sufficient capacitance, are laminated and integrated, it is possible to easily obtain a laminated electrolytic capacitor being small in size and large in capacitance.

Furthermore, The wound electrolytic capacitor can have a sufficiently large capacitance, since the capacitor unit is relatively smaller in size with respect to high capacitance. Moreover, by simply changing or adjusting the length of the electrolytic capacitor unit to be wound, the capacitance can be freely adjusted.

Furthermore, the method of the present invention comprises a step of anodizing, again, the anodized parts of the anode valve metal foils of the laminate, after electrically connecting the anode and cathode leads to the laminate.

According to the re-anodizing process, it is possible to repair partial damage at the dielectric layers, owing to mechanical stresses generated in laminating the capacitor units and integrating the metal surface portions.

In the method of producing the wound electrolytic capacitor anodizing a part of the anode valve metal foil again, after winding an electrolytic capacitor unit in the shape of coil. It is thus possible to repair partial damage at the dielectric layer, owing to mechanical stresses generated at the step of winding the electrolytic capacitor unit.

BRIEF DESCRIPTION OF THE DRAWINGS

The present invention will be described below in detail referring to the accompanying drawings, in which.

DETAILED DESCRIPTION OF THE INVENTION

Figure 1A:
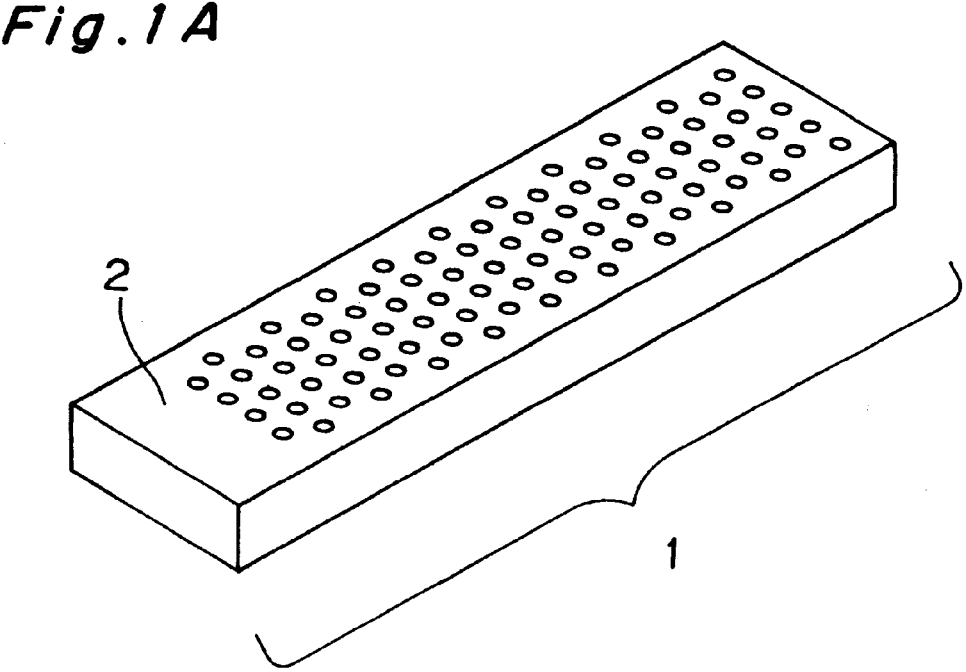
FIG. 1A is a schematic perspective view showing an anode layer of a valve metal foil according to an embodiment of the present invention.

In the electrolytic capacitor of the present invention, a valve metal foil 1 used for an anode layer 2 of the capacitor has plurality of small through holes 20 on its surface which is coarsened, as shown in FIG. 1A. The surface of the valve metal foil 1 is oxidized to form an dielectric layer 3 by anodizing, and this dielectric layer is used as a very thin dielectric layer.

Figure 1B:
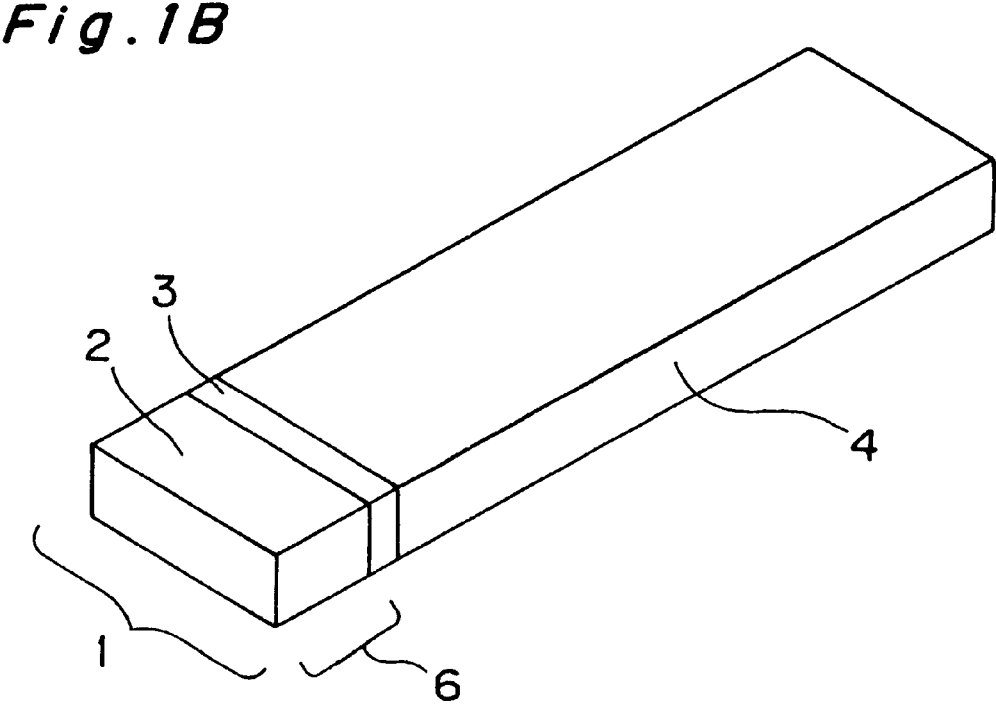
FIG. 1B is a schematic perspective view showing an electrolytic capacitor according to the present invention.
Figure 2A:
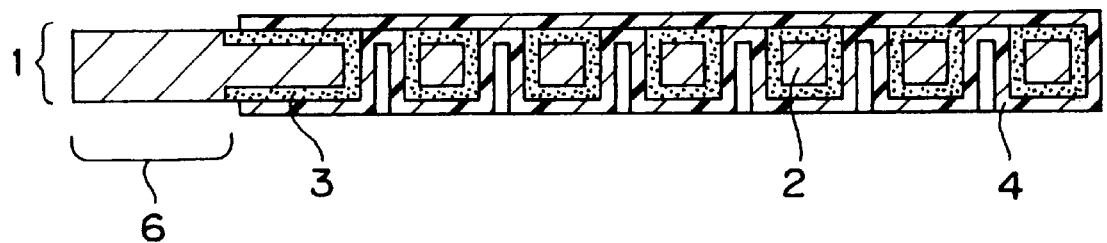
FIG. 2A is a schematic sectional view showing the electrolytic capacitor according to the embodiment of the present invention.
Figure 2B:
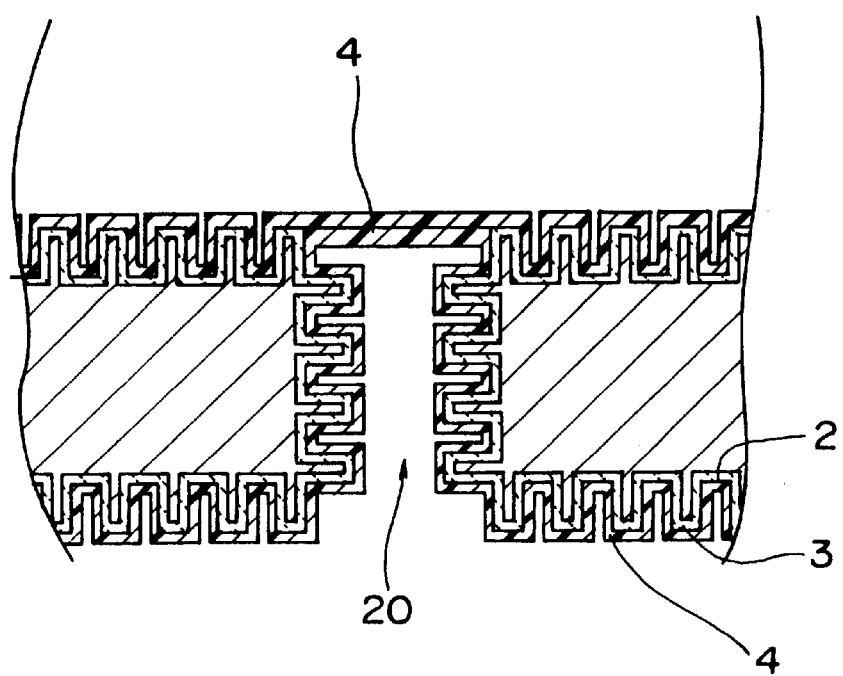
FIG. 2B is a partially enlarged sectional view showing the electrolytic capacitor shown in FIG. 2A.

On the dielectric layer 3 of the oxide film, an electrolytically-formed conductive polymer layer 4 is formed to cover the almost entire surface of the dielectric layer 3 as shown in FIG. 1B. The electrolytically-formed polymer layer 4 permeates into the plurality of through holes 20 so as to form a conductive layer with a very high density making close contact with the dielectric layer 3. The dielectric layer 3 is interposed between the anode layer 2 of the valve metal foil 1 and the electrolytically-formed conductive polymer layer 4 to form an electrolytic capacitor. This electrolytically-formed conductive polymer layer 4 is formed on a wide area of the dielectric layer 3 and serves as the cathode for the capacitor, whereby the capacitance of the capacitor can be raised sufficiently.

In the present invention, the metal constituting the valve metal foil 1 forms a stable oxide film on its surface. The metal is selected from a material, the oxide film of which is high in both insulation resistance and dielectric constant. As valve metal, such as aluminum, tantalum or niobium is used. Aluminum is preferably used for the valve metal foil because of its low cost, ease of processing and the like.

The plural through holes 20 formed through the valve metal foil 1 are used to allow a conductive polymer to pass through and grow into them in the process of electrolytic polymerization. It is preferable that the radius of the through hole is not more than the thickness of the valve metal foil 1. By providing the through holes 20, the area of the main surface of the valve metal foil is decreased.

On the other hand, by providing the thorough holes 20, areas are newly generated on the side surfaces of the through holes 20. The area of the main surface of the valve metal foil, decreased by providing the through holes 20, is compared with the areas on the side surfaces of the through holes 20, generated by providing the through holes 20. If the above-mentioned condition is established, that is, if the radius of the through hole is not more than the thickness of the valve metal foil, the area of the main surface of the valve metal foil is not decreased by providing the through holes 20.

In addition, it is preferable that the opening area of the through holes 20 is 10% or less of the surface area of the metal foil. If too many through holes 20 are formed, the mechanical strength of the valve metal foil 1 is lowered, causing inconvenience in production.

In the present invention, the electrolytically-formed conductive polymer layer 4 of the electrolytic capacitor are formed of a conductive polymer made by polymerizing a monomer. As will described later, another conducive polymer layer formed in advance on the surface of the valve metal foil, which is referred as to cathode-side conductive polymer layer, may be used as a cathode.

It is preferable that these polymer layers 4 and 5 are formed of a polymer obtained by polymerizing the monomer of a heterocyclic 5-member compound, such as pyrrole, thiophene, 3-alkylthiophene, isothianaphthene or the like.

Embodiment 1

In the invention, the conductive polymer layer 4 is formed by a method of subjecting the above-mentioned monomer to electrolytically oxidative polymerization. In the method, an electrolyzing electrode is utilized, which is formed previously on one side surface of the anode of the valve metal foil 1.

This embodiment can use a sheet or foil of metal, such as nickel, as a electrolyzing electrode. Other metals and non-organic substances may also be used if they can act as a positive electrode in the monomer solution for electrolyzing with no corrosion and anodic passivation.

The electrolyzing electrode and the valve metal, being attached in contact to each other, is immersed into the monomer solution. A current is supplied to the electrolyzing electrode (positive) attached on the valve metal foil and another electrode disposed in the solution so that an electrolytic polymerization reaction starts on the surface of the electrolyzing electrode by anodizing reaction. When the electrolysis is continued, a further polymerization reaction occurs continuously on the interface of the conductive polymer which has been produced. The new produced polymer reaches the oxide surface of the valve metal foil, then, passes through the insides of the through holes 20 to fill them, further extends to the other side surface of the valve metal foil, and grows integrally and continuously in the direction of the thickness of the valve metal foil while covering said foil. Thus, a uniformly densified polymer layer with high conductivity can be produced on the entire anodized surface of the valve metal foil.

As a result, this method can provide a conductive polymer layer necessary and sufficient for a electrolytic capacitor in a shorter period of time than the conventional method, simplifying production processes and reduce production cost of the capacitor.

Two leads formed of another conductive material, such as a metallic comb, are used as a lead to the anode lead and another to the cathode lead, and connected to the valve metal 2 and at least a part of one of the cathode-side conductive polymer layer 5 and the electrolytically-formed conductive polymer layer 4, respectively. The capacitor is then molded of resin in whole, thereby obtaining the final product.

The method of producing the electrolytic capacitor of the embodiment will be described below in more detail.

(a) First, through holes 20 are formed in a valve metal foil, and the surface of the foil is coarsened. In this step, plurality of through holes 20, preferably having an inner diameter of about 0.05 to 0.5 mm, are formed uniformly on the surface of the foil. These through holes 20 are used to allow a growing polymer layer to pass through in the process of electrolytic polymerization. As described above, it is preferable that the radius of the through hole is not more than the thickness of the anode valve metal foil.

The plural through holes 20 are formed in the valve metal foil by a mechanical method using a punching machine or a drill, a chemical method using etching or a combination method of these.

The surface of the valve metal foil can be coarsened by a chemical method using alternate current etching or direct current etching in an electrolytic solution, a mechanical method, such as sandblast, or a combination method of these.

(b) The surface of the anode valve metal foil is anodized to form a dielectric layer. In this step, in the case when an aluminum foil is used, its surface is anodized in a anodizing liquid so that an aluminum oxide layer is formed as the dielectric layer 3 on the surface of the aluminum foil.

Conventional methods, such as the constant voltage anodizing method and the constant current anodizing method conducted in a anodizing liquid, are used to form the dielectric layer.

(c) Next, a metal surface portion 6 is formed at a part of the surface of the anode valve metal foil. In this step, a part of the aluminum oxide layer on the surface of the aluminum foil is removed by grinding or cut off, and metal aluminum is exposed as a metal surface portion 6, as shown in FIG. 1A.

In the case of another exposing method, a part of the metal surface of the anode valve metal foil is masked with paint, adhesive tape or the like prior to the step of forming the dielectric layer. After formation, the mask is removed to expose the surface of the metal.

(d) Next, a electrolyzing electrode 9a is disposed on one side surface of the anode valve metal foil 1.

Figure 3A:
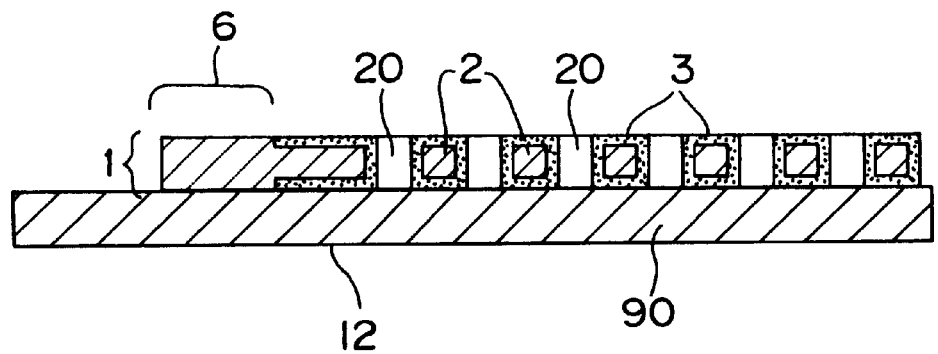
FIG. 3A is a schematic sectional view showing a electrolyzing electrode disposed on one side of an anode layer of a valve metal foil at a step of producing the electrolytic capacitor of the present invention.

In this step, the valve metal foil is attached to a metal sheet or plate used as the electrolyzing electrode 9a so that the dielectric layer 3 makes contact with the electrolyzing metal sheet 90. As an example, a electrolyzing metal sheet 90 (a nickel sheet, for example), used as the electrolyzing electrode 9a, can be made contact with the dielectric layer 3 as shown in FIG. 3A.

Figure 3B:
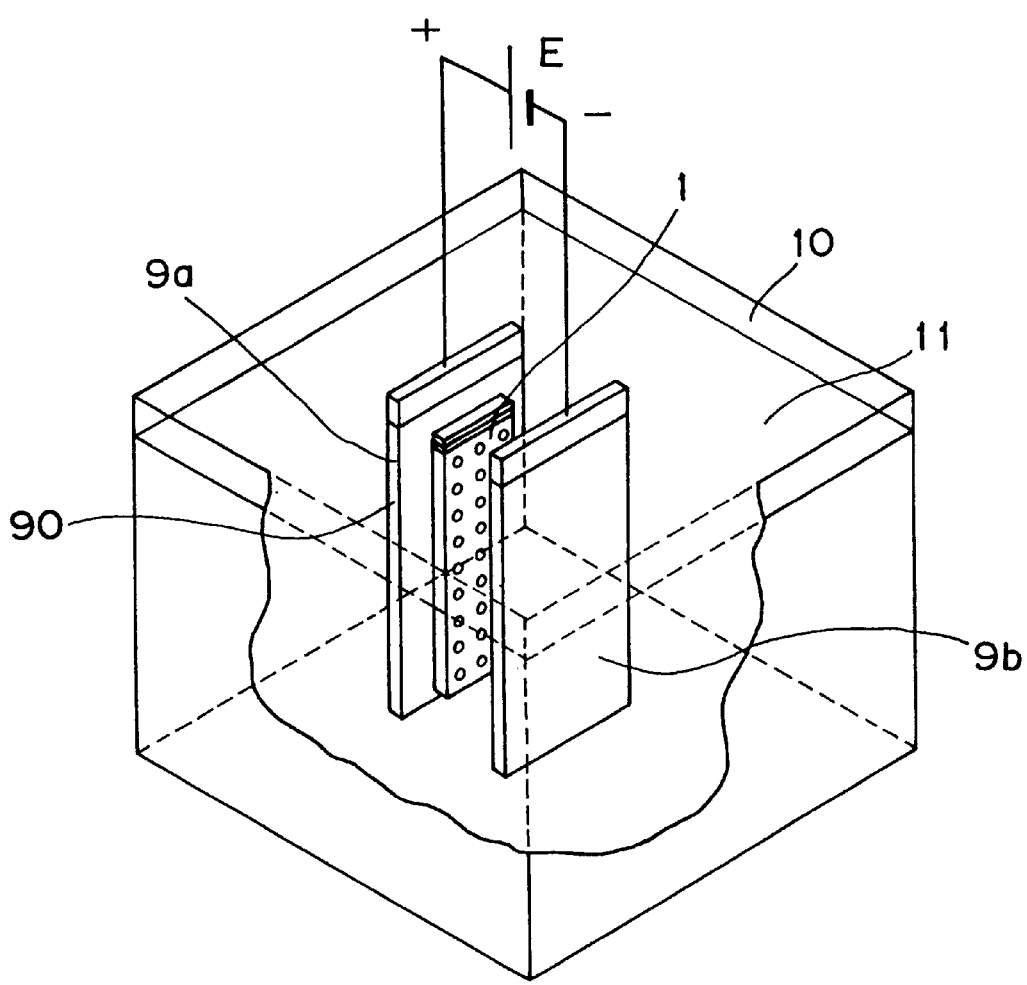
FIG. 3B is a schematic perspective view of an electrolytic bath, showing the arrangement of the anode layer of a valve metal foil and electrolyzing electrodes for electrolytic polymerization.

(e) Next, an electrolytically-formed conductive polymer layer is formed on the dielectric layer of the valve metal foil. In this polymerizing step, as shown in FIG. 3B, the valve metal foil 1 which is held on the electrolyzing electrode 9a (a nickel sheet) at the previous step is immersed in a monomer solution (a pyrrole solution, for example) to be polymerized to a conductive polymer. The valve metal foil is then subjected to electrolyzing, wherein the electrolyzing electrode 9a is used as the positive electrode and another electrode disposed in the solution is used as the negative, thereby to form a conductive polymer layer on the surface of the valve metal foil.

As the electrode other than the electrolyzing electrode 9a (a nickel sheet), an electrode 9b (preferably a nickel sheet having the same surface area as that of the electrolyzing electrode 9a) is disposed so as to be opposite to the electrolyzing electrode 9a (a nickel sheet) with respect to the valve metal foil. It is important that these electrodes are disposed opposite to each other in a container 10 filled with a monomer solution 11 (a pyrrole solution, for example) so that electric current flows through the plural through holes 20 when electric current is supplied.

Figure 4:
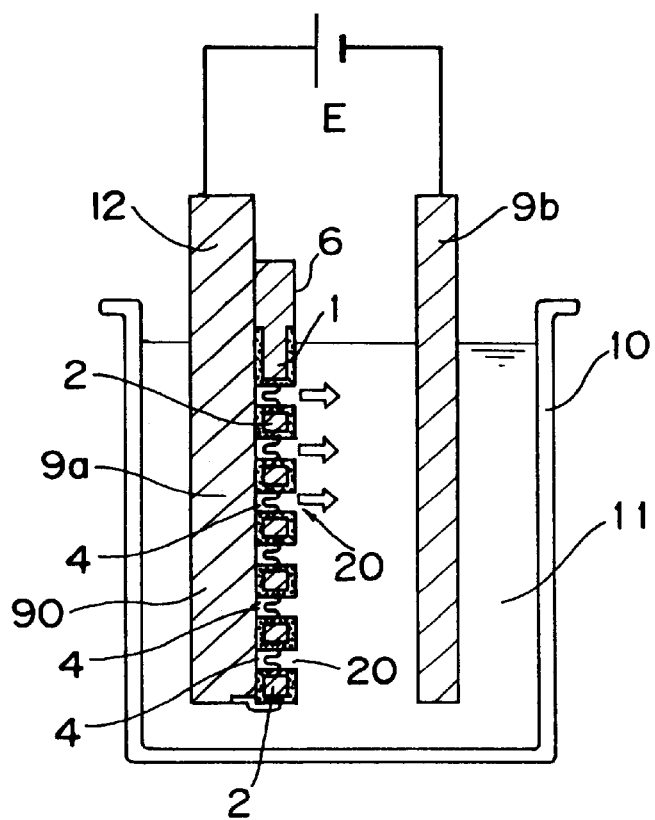
FIG. 4 is a schematic sectional view of an electrolytic bath, showing polymer formation at the step of performing the electrolytic oxidative polymerization for the electrolytic capacitor of the present invention.

While the monomer in the solution is polymerized by electrolytic polymerization starting from the electrolyzing electrode 9a, a polymer is allowed to grow so as to attach to the valve metal foil, to penetrate and pass through the through holes 20 (mainly in the directions of the arrows indicated in FIG. 4). By flowing electric current for a constant period of time, the electrolytic-formed conductive polymer 4 is also formed on the other side of the anode valve metal foil. Next, the valve metal foil 1 is removed from the nickel sheet used as the electrolyzing electrode 9a.

(f) In the same method as the step (d), an electrolyzing electrode 9a is disposed on the opposite side of the anode valve metal foil 1 having been removed.

The same method is carried out as the step (e), the electrolytically-formed conductive polymer layer 4 being formed on the dielectric layer 3. In the end, such an electrolytic capacitor as shown in FIGS. 1A, 1B, 2A and 2B can be obtained by following the above-mentioned steps and by removing the electrolyzing electrode 9a.

According to the method of the present invention, the electrolytically-formed conductive polymer layer can be formed simultaneously, integrally and continuously, in the direction of the thickness of the anode valve metal foil, starting from the electrolyzing electrode disposed on one side surface of the anode valve metal foil. This method can thus form the conductive polymer layer more quickly and easily than the conventional method, and can simplify production processes and reduce production cost.

Prior to the above polymerizing step (e), a conductive layer may be formed previously on the oxide film, and then the electrolytically-formed conductive polymer layer 4 may be formed by the electrolytic polymerization technique. As a conductive layer manganese dioxide may be formed by the thermal decomposition of magnesium nitrate. Another conductive layer may be a conductive polymer layer previously formed by chemical polymerization.

In this polymerizing step, electrolytic polymerization is started from the above electrolyzing electrode. When a conductive polymer reaches and makes contact with the conductive layer on the dielectric layer, the polymerization of the polymer is accelerated further starting from the conductive layer, and the conductive polymer is formed and allowed to grow. As a result, the electrolytically-formed conductive polymer layer can closely cover the dielectric layer of the oxide film, and the formation of the conductive polymer layer can be accelerated.

Embodiment 2

Figure 5:
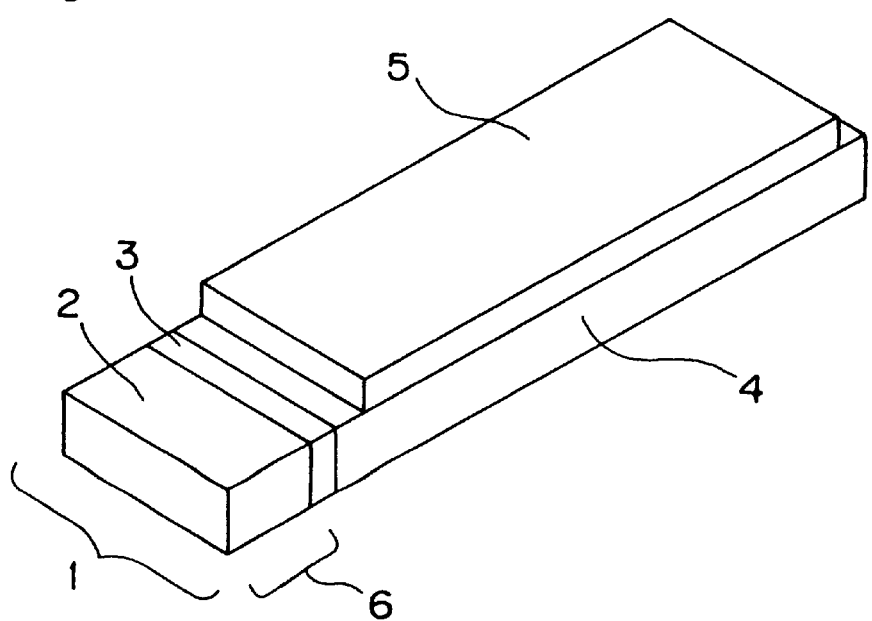
FIG. 5 is a schematic perspective view showing an electrolytic capacitor according to the embodiment of the present invention.
Figure 6A:
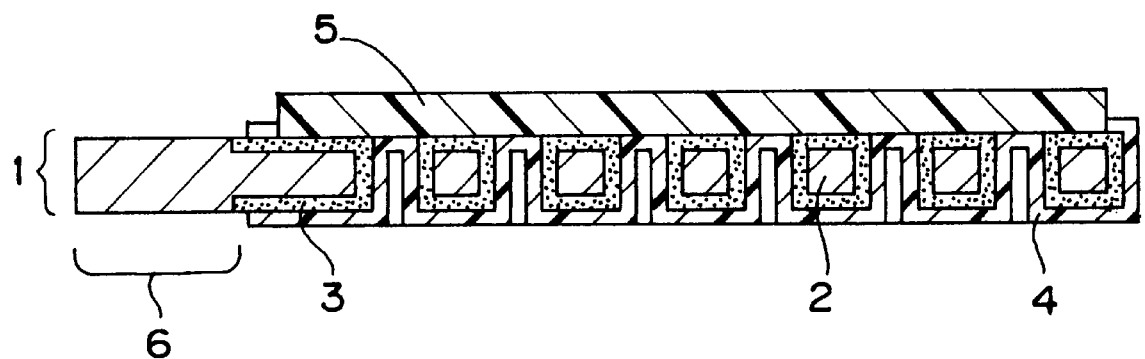
FIGS. 6A and 6B are views showing the embodiment of the present invention, similar to FIGS. 2A and 2B, respectively.
Figure 6B:
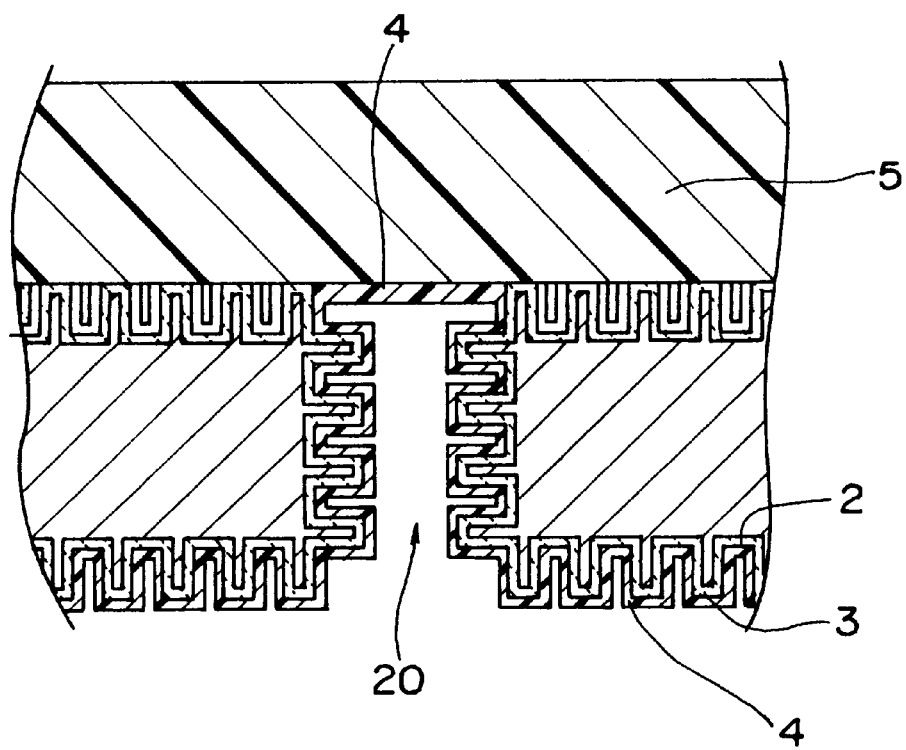

In the electrolytic capacitor of the present embodiment, a cathode-side conductive polymer layer 5 is formed, as part of a cathode layer, in advance on the dielectric layer 3 on one side surface of the anode valve metal foil 1, as shown in FIG. 5. The electrolytically-formed conductive polymer layer 4, which composes the rest of the cathode layer, a substantial cathode, covers the almost entire surface of the dielectric layer 3, penetrating the through holes 20 to fill their interiors. The cathode-side conductive polymer layer 5 is electrically connected to the electrolytically-formed conductive polymer layer 4, so that both the two conductive polymer layers 4 and 5 are a cathode layer to produce an electrolytic capacitor.

This electrolytic capacitor is formed by interposing the dielectric layer 3 between the anode valve metal foil 1 and the electrolytically-formed conductive polymer layer 4. This electrolytically-formed conductive polymer layer 4 may be formed uniformly in a wide area on the dielectric layer 3 of the oxide film and act as a substantial cathode, whereby the capacitance of the electrolytic capacitor can be increased sufficiently.

The electrolytically-formed conductive polymer layer 4 is formed by a method of polymerizing the conductive monomer due to electrolytically oxidative polymerization.

In this embodiment, the cathode-side conductive polymer layer 5 is used as part of an electrolyzing electrode, and an electrolyzing metal sheet 90 is formed previously on one side surface of the cathode-side conductive polymer. Namely, in this embodiment, the electrolyzing electrode comprises the cathode-side conductive polymer layer 5 and a electrolyzing metal sheet 90.

Electric current is supplied between this metal electrode 9a as a positive and another metal electrode 9b as a negative in the solution so that an electrolytic polymerization reaction starts on the cathode-side conductive polymer layer 5 as an positive electrode. When the electrolysis is continued, a further polymerization reaction occurs continuously at the interface of the new polymer which has been generated. The polymer reaches the surface of the valve metal foil 1, passes through the through holes 20 to fill them, extends to the other side surface of the metal foil, and grows integrally and continuously in the direction of the thickness of the valve metal foil while covering the valve metal foil 1. Thus, a conductive polymer layer is formed uniformly on the entire surface of the valve metal foil.

In the same manner as described in the embodiment 1, two leads formed of another conductive material, such as a metallic comb, are used as a anode lead and a cathode lead, being connected to a metal portion 6 of the valve metal foil 2 and at least a part of one of the cathode-side conductive polymer layer 5 and the electrolytically-formed conductive polymer layer 4, respectively.

The method of producing the electrolytic capacitor according to this embodiment will be described below. Just as in the case of the Embodiment 1, in the step (a) a metal foil is prepared, in the step (b) the anode valve metal foil 1 is anodized on the surface to form a dielectric layer 3 of the oxide film , and in the step (c) a metal surface portion 6 is formed at a part of the surface of the anode valve metal foil 1.

In the present embodiment, (d) a cathode-side conductive polymer layer 5 is disposed on one side surface of the anode valve metal foil 1, as a electrolyzing electrode, to carry out electrolytic polymerization.

Preferably, the cathode-side conductive polymer layer 5 may previously be formed on or attached to an electrolyzing metal sheet 90 used as a electrolyzing electrode, and then, the valve metal foil 1 is attached to this cathode-side conductive polymer layer 5 so as to make contact therewith.

For the electrolyzing metal sheet 90, a nickel sheet, for example, may be used as a electrolyzing electrode, and the conductive polymer layer 5 is attached to or formed on the nickel sheet.

Such a cathode-side conductive polymer layer 5 can be formed of a polymer layer, such as a polypyrrole layer, on one side surface of the electrolyzing metal sheet, based on a polymerizable conductive monomer, such as pyrrole, by the electrolytic polymerization technique.

The above-mentioned conductive polymer layer 5 may be previously attached mechanically under pressure to the valve metal foil 1.

Figure 7A:
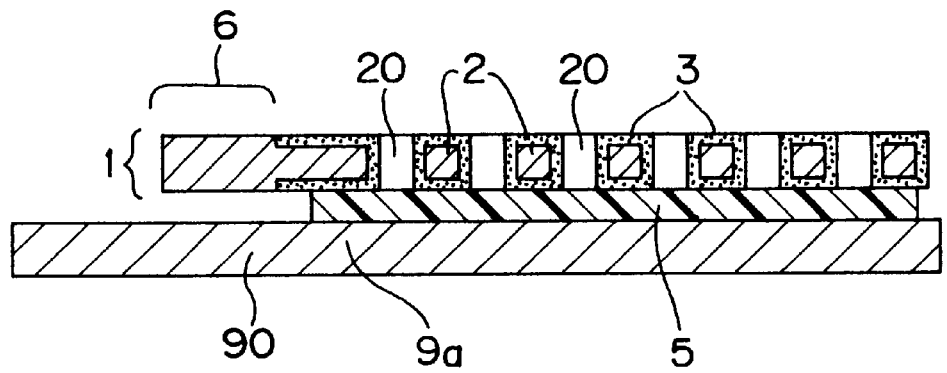
FIGS. 7A and 7B are views showing the embodiment of the present invention, similar to FIGS. 3A and 3B, respectively.

The valve metal foil 1 is made close contact with the cathode-side conductive polymer layer 5 as the electrolyzing electrode so that the dielectric layer 3 is made contact with the polymer layer 5 as shown in FIG. 7A.

The cathode-side conductive polymer layer 5 can be attached mechanically under pressure to the dielectric layer 3 so as to be firmly secured to the valve metal foil 1.

Figure 7B:
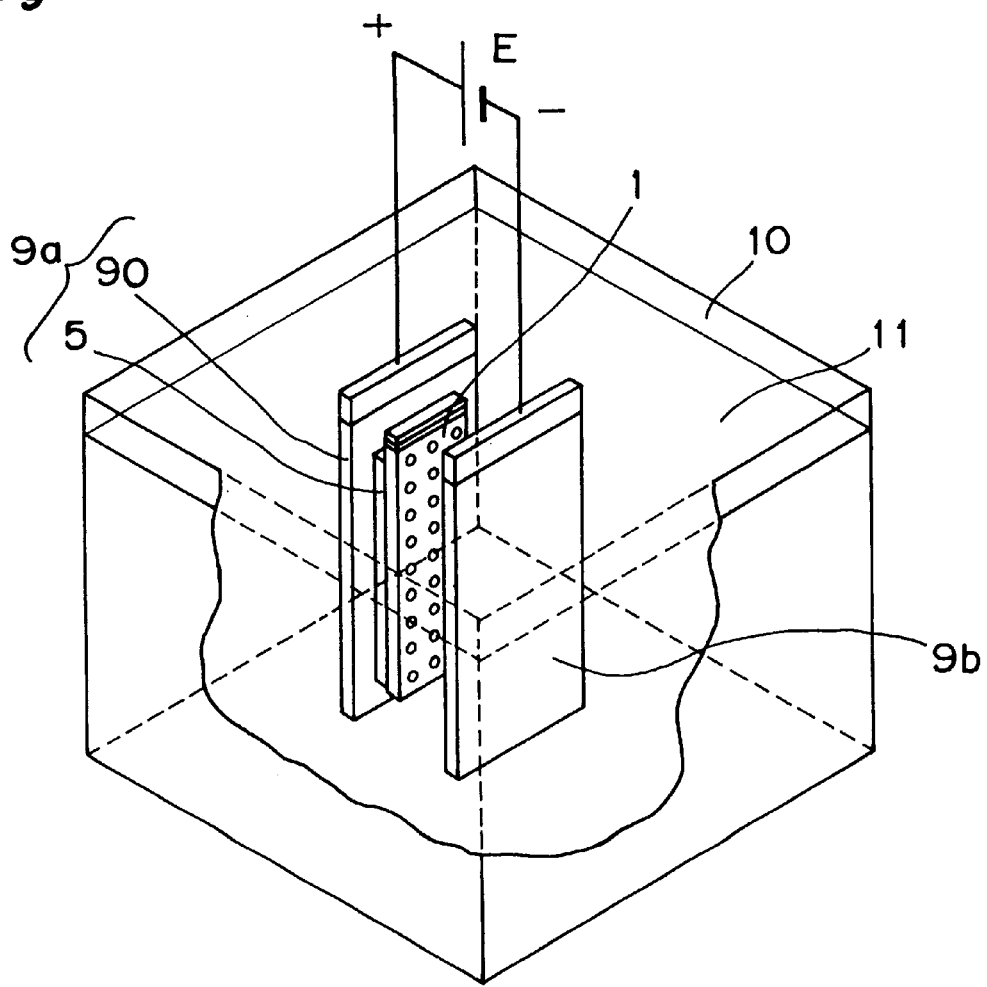

(e) Next, an electrolytically-formed conductive polymer layer electrically connected to the cathode-side conductive polymer layer 5 is formed on the dielectric layer 3 of the valve metal foil 1 as described below. As shown in FIG. 7B, the valve metal foil 1 held on the electrolyzing metal sheet 90 of the electrolyzing electrode 9a at the previous step is immersed in a conductive monomer solution 11, and electrolyzed. Consequently, the conductive polymer layer 4 is formed on the surface of the valve metal foil 1. In this electrolytic polymerizing step, the electrolyzing electrode 9a (a nickel sheet, for example) is used as the anode, and another electrode 9b, e.g., a nickel sheet, disposed opposite to the electrode 9a, having the same area as that of the electrolytic 9a, is used as the cathode.

These electrodes 9a and 9b are disposed opposite to each other in a container 10 filled with a monomer solution 11 (a pyrrole solution, for example), and electric current is supplied across the electrodes. A polymer is newly generated by electrolysis, starting on the cathode-side conductive polymer layer 5. While the through holes 20 20 in the valve metal foil 1 are filled with the polymer, an electrolytically-formed conductive polymer layer 4 is formed as mainly shown in FIG. 8A. Electric current is supplied for a predetermined period of time to form the electrolytically-formed conductive polymer layer 4.

After the above-mentioned step, the nickel sheet, used as electrolyzing metal sheet 90 for a electrode 9a, is finally removed on the interface contact to the cathode-side conductive polymer layer 5. As a result, such electrolytic capacitors as shown in FIGS. 1A, 1B, 6A and 6B can be obtained.

Figure 8A:
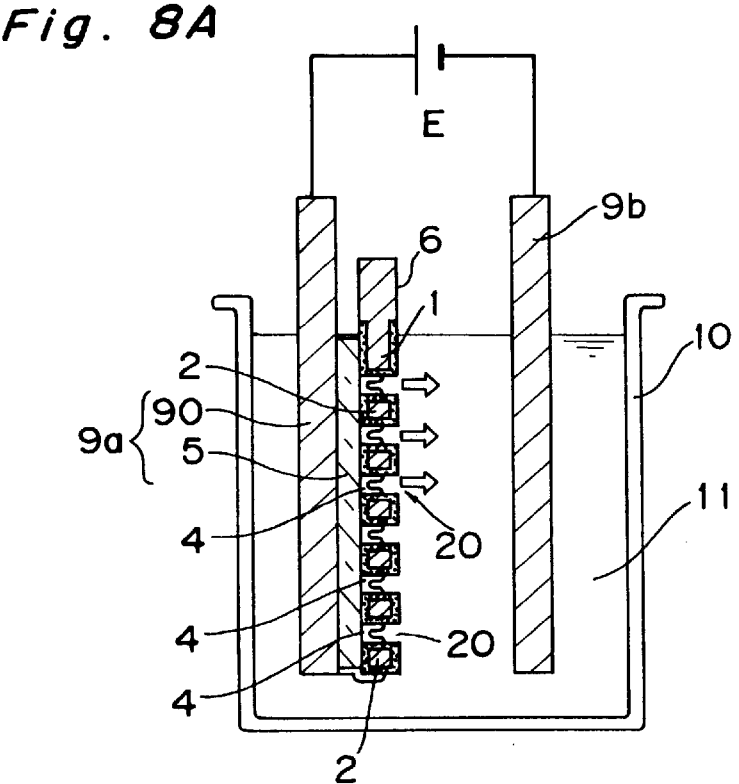
FIGS. 8A and 8B are schematic sectional views of electrolytic baths, showing polymer formation at the step of carrying out the electrolytic oxidative polymerization for the electrolytic capacitor of the embodiment of the present invention.
Figure 8B:
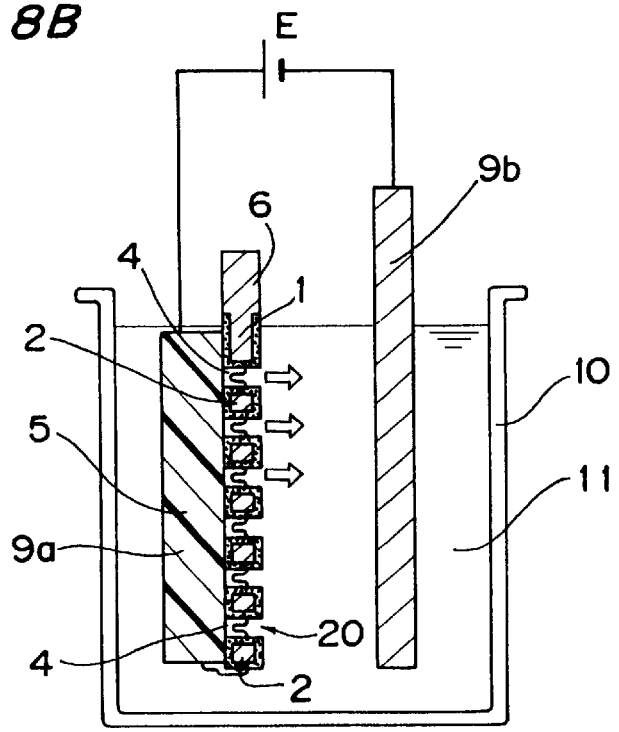

In the above-mentioned steps (d) and (e), it is not always necessary to use electrolyzing metal sheet 90 as a part of the electrolyzing electrode 9a, provided that the cathode-side conductive polymer layer 5 has a sufficient thickness and a sufficiently low electrical resistance, which may be used independently as a electrolyzing electrode 9a. In this case, as shown in FIG. 8B, it is possible to use an electrolysis method, wherein electric current is applied across the cathode-side conductive polymer layer 5, as electrolyzing electrode 9a, and the solution-side electrode 9b being opposite thereto.

In the present embodiment, it is also possible at the above-mentioned step (e) that a cathode-side conductive layer may be previously formed on the dielectric layer 3, and the electrolytically-formed conductive polymer layer 4 is then formed by the electrolytically oxidative polymerization technique as described above.

According to this method, the electrolytically-formed conductive polymer layer 4 electrically connected to the cathode-side conductive polymer layer 5 can be formed easily on the dielectric oxide film. Therefore, it is possible to easily obtain an electrolytic capacitor capable of delivering a large capacitance sufficiently close to its design capacitance.

The electrolytically-formed conductive polymer layer can be formed simultaneously, integrally and continuously, in the direction of the thickness of the anode valve metal foil, starting from the cathode-side conductive polymer layer disposed formed or disposed on one side surface of the anode valve metal foil. This method can thus form the conductive polymer layer more quickly and easily than the conventional method, and can simplify production processes and reduce production cost.

Embodiment 3

Figure 9:
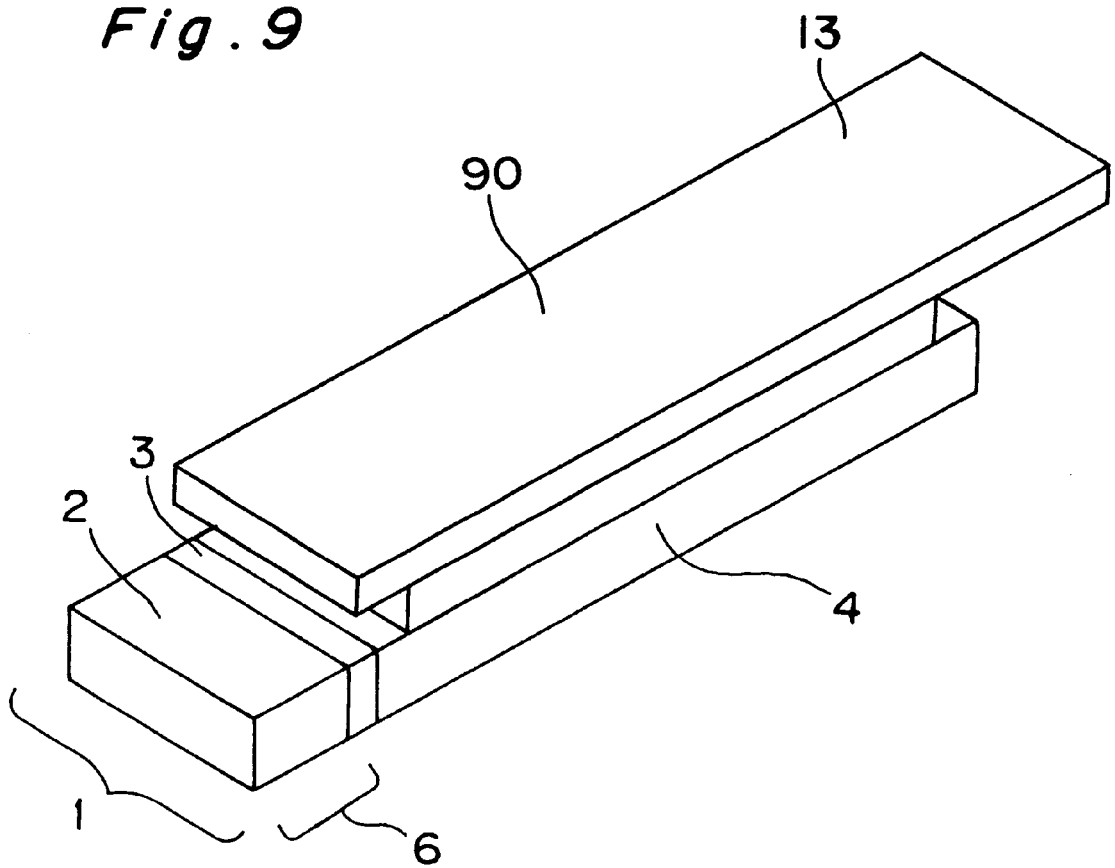
FIG. 9 is a schematic perspective view showing an electrolytic capacitor according to a embodiment of the present invention.

In the present embodiment, a conductive polymer layer 5 is formed on a dielectric layer 3 on one side surface of an anode valve metal foil 1 as shown in FIG. 9.

Furthermore, an electrolytically-formed conductive polymer layer 4 covers the almost entire surface of the dielectric layer 3, and penetrates the through holes 20 in the metal foil 1. A cathode electric collector 13, made of a metal sheet, is electrically connected to the electrolytically-formed conductive polymer layer 4 via the cathode-side conductive polymer layer 5, thereby forming an electrolytic capacitor. This electrolytically-formed conductive polymer layer 4 is formed in a wide area on the dielectric layer 3 and functions as the cathode, whereby the capacitance of the electrolytic capacitor can be raised sufficiently.

Furthermore, the cathode electric collector 13 electrically connected to the electrolytically-formed conductive polymer layer 4 is formed and used for lead connection.

Two leads formed of another conductive material, such as a metallic comb, are used as a lead to the anode and a lead to the cathode, and connected to the valve metal 2 and the cathode electric collector 13, respectively. The whole is then molded of resin, thereby obtaining the final product.

The method of producing the electrolytic capacitor of the present invention will be described below.

In this method of this embodiment, the step of forming the through holes 20 in the anode valve metal foil 1 and coarsening the surface of said foil, the step of anodizing the surface of the anode valve metal foil to form the dielectric layer, and the step of forming the metal surface portion at a part of the surface of the anode valve metal foil are the same as the steps (a) to (c) of the above-mentioned production method, respectively.

(d) a cathode-side conductive polymer layer is formed or disposed on one side surface of the anode valve metal foil. In this step, a cathode-side conductive polymer layer is formed on or attached to the electrolyzing metal sheet which is used later as the cathode electric collector 13. The anode valve metal foil 1 is attached to this conductive polymer layer so as to make contact therewith.

In an example of this step, first, a electrolyzing metal sheet 90 (a nickel foil, for example) is used as the cathode electric collector 13, and the conductive polymer layer 5 is formed of a polymer layer from a polymeriziable conductive monomer, such as pyrrole, on one side surface of the nickel foil of the electrolyzing metal sheet 90 by the electrolytic polymerization technique. In this step, the conductive polymer layer 5 may be previously attached mechanically under pressure to the cathode electric collector 13.

Figure 11A:
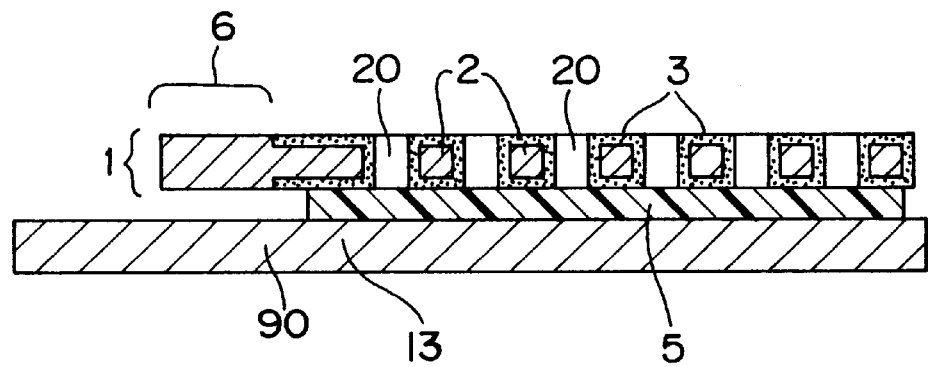
FIGS. 11A and 11B are views showing the embodiment of the present invention, similar to FIGS. 3A and 3B, respectively.

Next, the anode valve metal foil 1 is disposed on the cathode-side conductive polymer layer 5 so that the dielectric layer 3 is made contact with the polymer layer 5 as shown in FIG. 11A. The polymer layer 5 can be attached mechanically under pressure to the dielectric layer 3 so as to be firmly secured to the valve metal foil 1.

(e) Next, the electrolytically-formed conductive polymer layer electrically connected to the cathode-side conductive polymer layer is formed on the dielectric layer of the metal foil as described below.

Figure 11B:
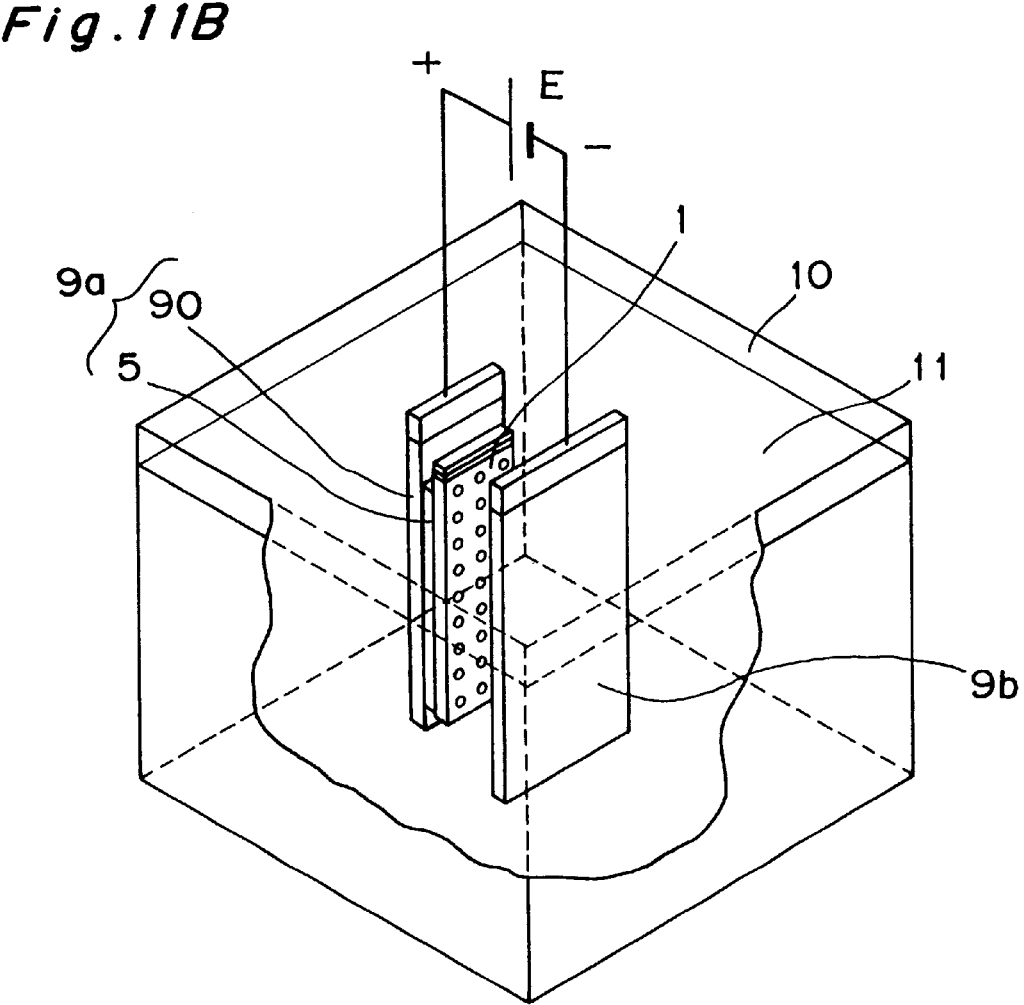

As shown in FIG. 11B, the valve metal foil held on the cathode electric collector 13 (a nickel foil) at the previous step is immersed in a conductive monomer solution, and subjected to electrolysis, wherein the cathode electric collector 13 is used as an electrolyzing metal sheet 90 for the electrolyzing electrode 9a. As a result, the conductive polymer layer is formed on the surface of the valve metal foil.

In this electrolytic polymerizing step, the cathode electrolyzing metal sheet 90 is used as the positive electrode and another electrolyzing electrode 9b disposed opposite to the electrolyzing metal sheet 90, having the same area as that of the electrolyzing metal sheet 90, is as the negative. These electrodes are disposed opposite to each other in a container 10 filled with a monomer solution 11 (a pyrrole solution, for example), and electric current is supplied across the electrodes.

Figure 12:
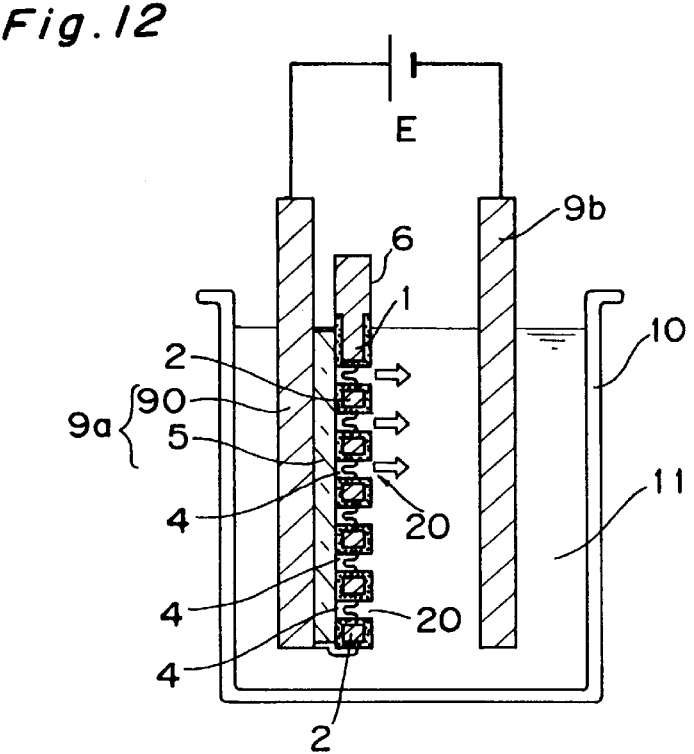
FIG. 12 is a view showing the embodiment of the present invention, similar to FIG. 4.

By electrolyzing, polypyrrole used as the electrolytically-formed conductive polymer layer 4 is allowed to grow, mainly in the directions of the arrows indicated in FIG. 12 during polymerization, starting from the cathode-side conductive polymer layer 5 on the cathode electric collector 13. Electric current is supplied for a constant period of time to form the electrolytically-formed conductive polymer layer 4.

Figure 10A:
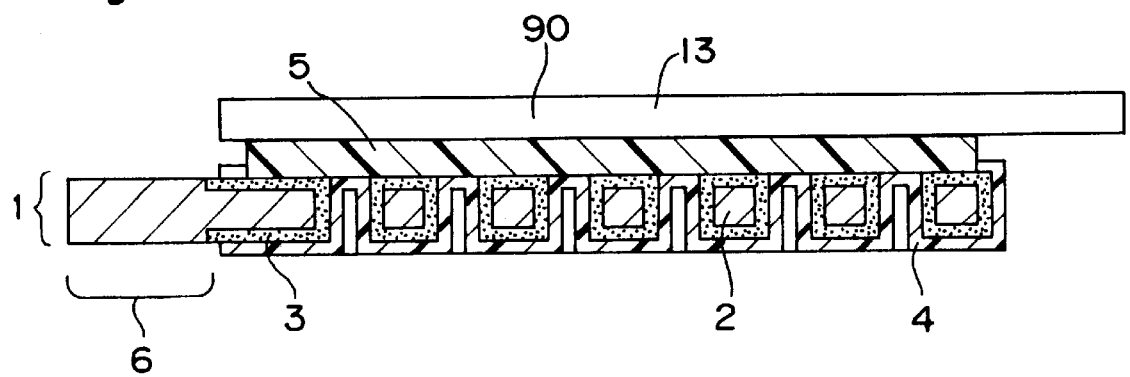
FIGS. 10A and 10B are views showing the embodiment of the present invention, similar to FIGS. 2A and 2B, respectively.
Figure 10B:
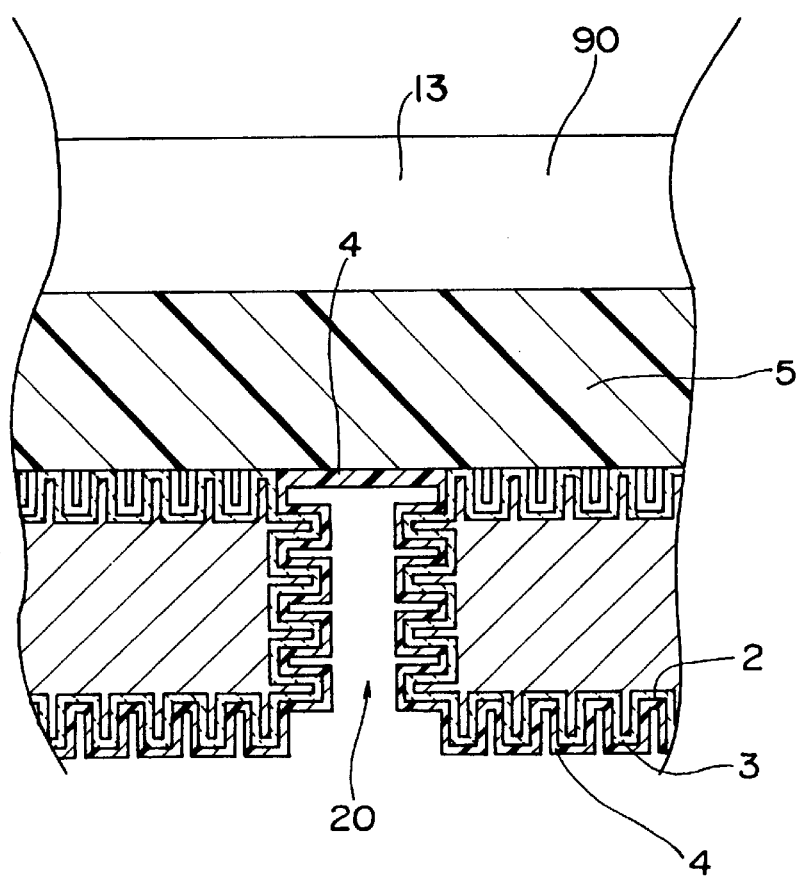

After the above step, the nickel foil used as the electrolyzing metal sheet 90 may finally be removed from the interface to the cathode-side conductive polymer layer 5. As a result, such an electrolytic capacitor as shown in FIGS. 9A, 10A and 10B can be obtained.

However, the electrolyzing metal sheet 90 may remain on the cathode-side conductive polymer layer 5 to be used as a cathode electric collector 13 to which a cathode lead is connected, in the final product of the electrolytic capacitor.

Since this electrolytic capacitor is provided with the cathode electric collector, the electrolytic capacitor can have a large capacitance easily.

Embodiment 4

According to this present embodiment, a plurality of electrolytic capacitor units, each comprising an anode valve metal foil and a cathode-side conductive polymer layer, are laminated to have a multilayer structure.

Figure 13:
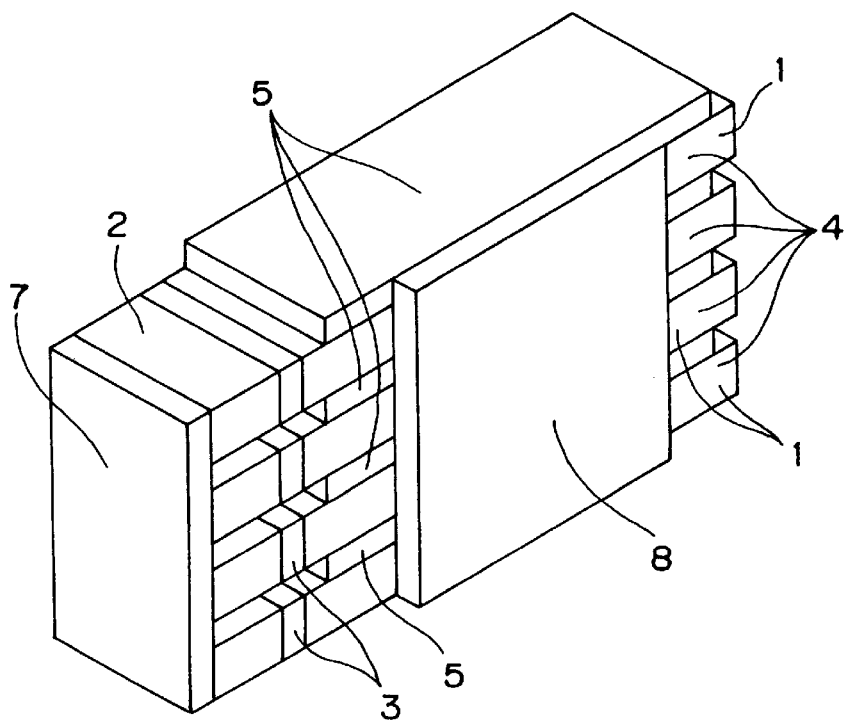
FIG. 13 is a schematic perspective view showing a laminated electrolytic capacitor according to the embodiment of the present invention.

In the laminated electrolytic capacitor shown in FIG. 13, a plurality of electrolytic capacitor units, each being shown in FIG. 5, are laminated, with their main surfaces being overlaid alternately. An anode-leading electrode 7 is electrically connected to the metal surface portions 6 of the valve metals 2 of all the capacitor units, being electrically insulated from both the cathode-side conductive polymer layers 5 and the electrolytically-formed conductive polymer layers 4 of all the capacitor units.

A cathode-leading electrode 8 is electrically connected to the cathode-side conductive polymer layers 5 and the electrolytically-formed conductive polymer layers 4 of all the capacitor units, and electrically insulated from the metal surface portions 6 of all the capacitor units. This laminated capacitor is molded of resin on the whole to form a final shape of electrolytic capacitor.

In the laminated electrolytic capacitor in this example, the capacitor unit itself has a large capacitance, and the plural capacitor units are laminated and integrated. Therefore, it is possible to easily obtain an electrolytic capacitor being small in size and large in capacitance.

This laminated electrolytic capacitor can be produced by the method described below.

(a) At the step of laminating plurality of electrolytic capacitors, such an electrolytic capacitor as shown in FIG. 5 is used as a capacitor unit. In this example, four capacitor units are piled so that the metal surface portions 6 of all the capacitor units are aligned at the same position as shown in FIG. 13.

(b) These capacitor units are electrically connected to one another at the metal surface portions 6 of the anode valve metal foils 1 and integrated into one capacitor. The metal surface portions 6 of all the laminated electrolytic capacitor units are physically secured and made electrically conductive to one another.

The piling method may be composed of steps of bonding a nickel sheet used as the anode-lead electrode 7 by using a conductive adhesive, crimping the nickel sheet by using a fixture, and, of welding the nickel sheet. A combination of these steps can be employed for the method. A metal or resin can be used as a material to integrate the capacitor units, provided that such a material satisfies the above requirements.

(c) The cathode-side conductive polymer layers of the anode valve metal foils are electrically connected to one another and integrated. The laminated electrolytic capacitor units are secured and electrically connected to one another at the cathode-side conductive polymer layers 5 or the electrolytically-formed conductive polymer layers 4.

For more concrete method of the integration, it is possible to use a method of bonding a metal used as the cathode-leading electrode 8, such as a nickel sheet by using a conductive adhesive, a method of crimping the metal by using a fixture, or a method of forming a conductive polymer by the chemical polymerization technique or the electrolytically oxidative polymerization technique to attain integration.

Furthermore, a metal or resin can be used as a material for the integration, provided that such a material satisfies the above-mentioned requirements.

The sequence of the above-mentioned steps (b) and (c) may be reversed.

By following the above-mentioned steps in sequence, the electrolytic capacitor shown in FIG. 13 can be obtained. Furthermore, the capacitor should preferably be molded of resin or the like on the whole to obtain the final product.

According to this production method, a plurality of capacitor units, each capable of delivering a capacitance sufficiently close to its design value, are laminated and integrated. As a result, it is possible to easily obtain an electrolytic capacitor being small in size and large in capacitance. The number of laminated electrolytic capacitor units is adjusted as necessary in accordance with the dimensions and capacitance of the electrolytic capacitor to be obtained as the final product.

The electrolytic capacitor of the present invention is characterized in that a plurality of electrolytic capacitor units, each comprising an anode valve metal foil and a cathode-side conductive polymer layer, are laminated to have a multi-layer structure.

In this example, the electrolytic capacitor shown in FIG. 5 is used as an electrolytic capacitor unit, and a plurality of the capacitor units is laminated to have a multi-layer structure. In addition, the same effects can be obtained even when the electrolytic capacitors shown in FIGS. 1 and 9 are used as an electrolytic capacitor unit, and a plurality of the capacitor units are laminated.

Embodiment 5

The electrolytic capacitor production method of the present invention can further include a step of anodizing parts of the anode valve metal foils 1 again. In this case, (a) a plurality of electrolytic capacitor units are laminated, (b) the metal surface portions of the anode valve metal foils are electrically connected to one another and integrated, and (c) parts of the anode valve metal foils are re-anodized.

In the step (c) of re-anodization carried out again, parts of the anode valve metal foils, other than the metal surface portions of the laminated electrolytic capacitor units, are anodized again in a anodizing liquid to form aluminum oxide layers. In this step, a conventional method, such as the constant-current anodizing method or the constant-voltage anodizing method conducted in a anodizing liquid, can be used as a method of oxidation.

After the formation treatment, the cathode-side conductive polymer layers are electrically connected to one another and integrated.

According to this production method, partial damage at the dielectric layer, owing to mechanical stresses generated at the lamination step and the step of integrating the metal surface portions, can be repaired by conducting the subsequent step (c). As a result, the electrolytic capacitor thus obtained can have higher reliability.

Embodiment 6

This embodiment relates to a wound electrolytic capacitor, wherein an electrolytic capacitor unit comprising an anode valve metal foil and a cathode-side conductive polymer layer is wound in the shape of a coil to obtain a multilayer structure. Examples of the wound electrolytic capacitor are shown in FIGS. 14A and 14B.

Figure 14A:
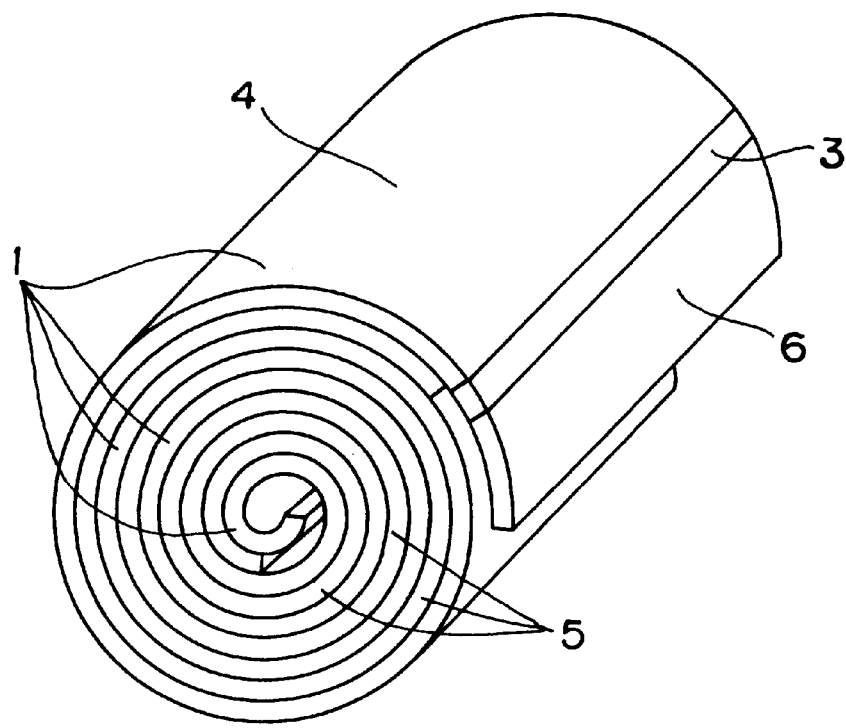
FIGS. 14A and 14B are schematic perspective views showing wound electrolytic capacitors according to the embodiment of the present invention.

The electrolytic capacitor shown in FIG. 14A is made as described below. An electrolytic capacitor unit shown in FIG. 1B or FIG. 5 is formed of an elongated anode valve metal foil 1, and a metal surface portion 6 is exposed at an end portion of the valve metal foil 1. This long electrolytic capacitor unit is wound from the other end thereof in the shape of a coil so that the metal surface portion 6 at the end portion is formed on the external peripheral surface.

A capacitor can be made by installing an anode lead to the metal surface portion 6 and by installing a cathode lead to at least a part of at least one of the cathode-side conductive polymer layer 5 and the electrolytically-formed conductive polymer layer 4. It is thus possible to obtain an electrolytic capacitor being small in size and large in capacitance. The capacitance of the wound electrolytic capacitor can be changed easily by simply changing the length of the electrolytic capacitor unit, whereby the capacitor can be produced easily.

Figure 14B:
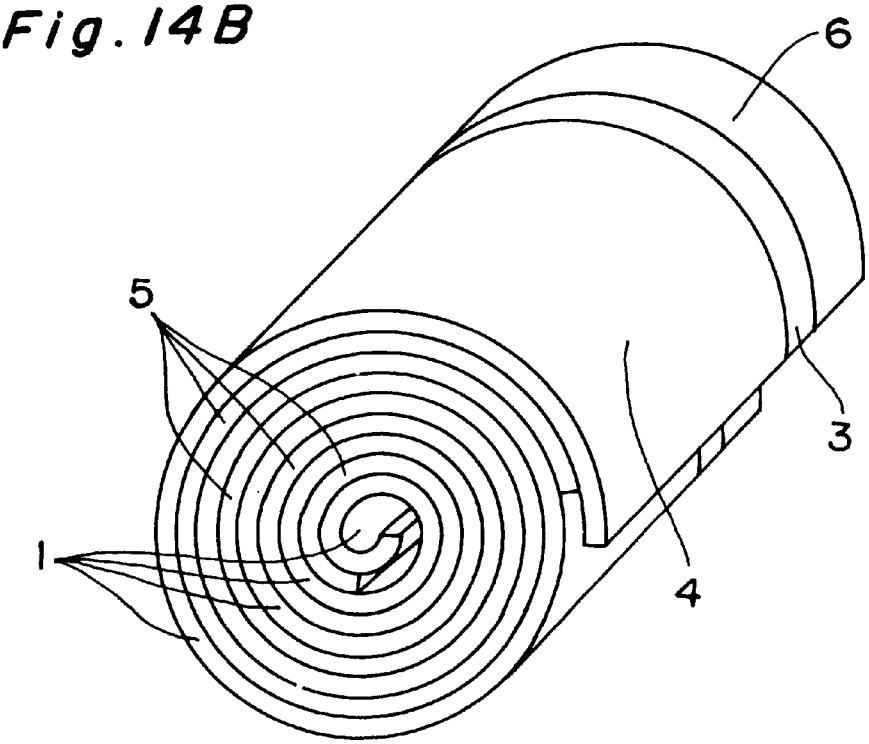

FIG. 14B shows another wound electrolytic capacitor, wherein an electrolytic capacitor unit is formed of a long anode valve metal foil 1, and a metal surface portion 6 is formed at the side edge portion of the valve metal foil 1. The electrolytic capacitor unit is wound in the shape of a coil from the end portion thereof so that the metal surface portion 6 at the side edge portion is formed at the end portion of the formed coil.

As an anode lead, another conductive material, such as a metallic comb, is connected to the valve metal foil 1. Furthermore, as a cathode lead, another conductive material, such as a metallic comb, is connected to a part of at least one of the cathode-side conductive polymer layer 5 and the electrolytically-formed conductive polymer layer 4. The electrolytic capacitor is then molded of resin on the whole to obtain the final product.

A bonding method by using an epoxy resin (not shown) can be used to secure the wound capacitor, provided that the metal surface portion 6 is electrically insulated from the cathode-side conductive polymer layer 5.

To obtain the final product, an positive electrolyzing electrode 9a (not shown) is electrically connected to the metal surface portion 6 made of the valve metal 2 while being electrically insulated from the cathode-side conductive polymer layer 5 and the electrolytically-formed conductive polymer layer 4. In addition, a cathode-leading electrode (not shown) is electrically connected to the cathode-side conductive polymer layer 5 and the electrolytically-formed conductive polymer layer 4 while being electrically insulated from the metal surface portion 6. The capacitor is then packaged on the whole with a molding resin (not shown).

Embodiment 7

A step of carrying out the formation again can also be employed in the production of the wound electrolytic capacitor. Except for the metal surface portion for connection, the anode valve metal foil of the electrolytic capacitor wound in the shape of the coil is anodized again. In this step, the anode valve metal foil of the wound electrolytic capacitor is anodized again in a anodizing liquid to form an aluminum oxide layer. In this step, it is possible to employ a conventional method, such as the constant-current anodizing method or the constant-voltage anodizing method conducted in a anodizing liquid.

This re-anodizing can repair partial damage at the dielectric layer of the oxide film, owing to mechanical stresses generated at the step of winding the electrolytic capacitor unit. As a result, the electrolytic capacitor thus obtained can have higher reliability.

EXAMPLE 1

(a) First, an anode valve metal foil 1 having through holes 20 and a coarsened surface was prepared as described below. An aluminum foil (a soft material) having a purity of 99.98% or more and measuring 100 $\mu$m in thickness, 5 mm in width and 13 mm in length was prepared. Next, thorough holes 20 having 0.2 mm in diameter were formed at a density of 50 hole/cm$^2$ in the aluminum foil by using a punching machine used as means for forming the through holes 20 in the anode valve metal foil.

Furthermore, alternating current etching was used as means for coarsening the surface of the anode valve metal foil 1. The etching was carried out at a current density of 0.2 A/cm$^2$ and a frequency of 20 Hz in a hydrochloric acid solution having a concentration of 10 wt % and a temperature of 30° C. used as an electrolytic solution in order to etch the above-mentioned aluminum foil having the through holes 20.

(b) A step of oxidizing the surface of the anode valve metal foil 1 was carried out to form the dielectric layer 3. Constant-voltage anodization was carried out at a anodizing voltage of 20 V in an aqueous solution of ammonium adipate having a concentration of 5 wt % and a temperature of 60° C. used as a anodizing liquid in order to form aluminum oxide used as the dielectric layer of the oxide film 3 on the surface of the anode valve metal foil.

(c) A step of forming a metal surface portion 6 at a part of the surface of the anode valve metal foil 1 was carried out as described below. A part of the aluminum oxide on the surface of the anode valve metal foil (the end portion of said foil 1, measuring 5 mm in width and 2 mm in length) was removed by grinding with sandpaper to obtain an aluminum surface exposed as the metal surface portion 6.

The capacitance of the entire surface of the dielectric oxide film on the aluminum foil obtained by the above-mentioned step was measured at 10 Hz in an aqueous solution of ammonium borate having a conductivity of 50 mS/cm. The capacitance (herein after referred to as a "foil capacitance") obtained as the result of the measurement at 10 Hz was 28.2 $\mu$F on average.

(d) Next, a electrolyzing electrode 9a was disposed on one side of the a nod e valve metal foil 1, except for the metal surface portion 6, as described below. A nickel sheet measuring 10 mm in width, 20 mm in length and 50 $\mu$m in thickness was prepared as the electrolyzing electrode 9a. The aluminum foil used as the above-mentioned anode valve metal foil 1 was disposed on this nickel sheet while using care not to contact the metal surface portion 6 with the nickel sheet, and the oxidation film layer 3 was made contact with the electrolyzing electrode 9a.

(e) Next, an electrolytically-formed conductive polymer layer 4 was formed on the dielectric layer of the oxide film 3 as described below.

A 10% aqueous solution of isopropyl alcohol including 1 mol/l of pyrrole as a monomer and 2 wt % of aryl sodium sulfonate as an electrolyte was used as a monomer solution.

This monomer solution 11 was adjusted to have a temperature of 20° C. The valve metal foil 1 disposed on the above-mentioned electrolyzing electrode 9a was immersed in the solution. As shown in FIGS. 3B and 4, a nickel sheet measuring 10 mm in width, 20 mm in length and 50 $\mu$m in thickness was disposed as another electrolyzing electrode 9 in the solution so as to face the sample with a distance of 1 cm thereto.

A polypyrrole layer was formed as the electrolytically-formed conductive polymer layer 4 by electrolytic polymerization by using the electrolyzing electrode 9a as the positive electrolyzing electrode 9a and by applying a voltage of 10 V for five minutes. The nickel sheet used as the electrolyzing electrode 9a was then removed from the valve metal foil 1.

(f) Furthermore, the removed nickel sheet used as the electrolyzing electrode 9a was disposed on the other side surface of the anode valve metal foil 1 just as in the case of the above-mentioned step (d).

The electrolytically-formed conductive polymer layer 4 was further formed on the dielectric oxide film 3 by using the nickel sheet as the electrolyzing electrode 9a and by flowing electric current for five minutes just as in the case of the step (e). The electrolytically-formed conductive polymer layer 4 of the present embodiment was formed by polymerization (the electrolytically oxidative polymerization technique) by supplying electric current for 10 minutes in total.

The electrolytic capacitor having the structure shown FIG. 1B was obtained by following the above-mentioned steps.

Figure 15:
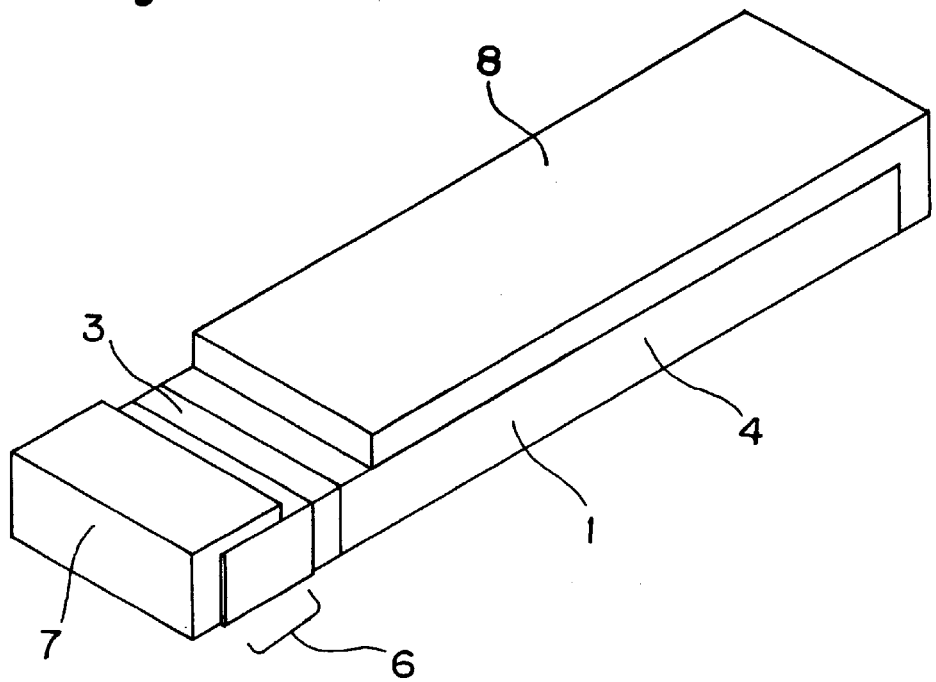
FIG. 15 is a schematic perspective view showing an electrolytic capacitor according to the embodiment of the present invention.

(g) On the polypyrrole layer used as the electrolytically-formed conductive polymer layer 4 of the electrolytic capacitor obtained by following the above-mentioned steps, an L-shaped nickel sheet used as a cathode-leading electrode 8 was bonded and secured to the end portion of the electrolytic capacitor by using a conductive adhesive (not shown) including carbon and silver paste (not shown) as shown in FIG. 15. Furthermore, an L-shaped nickel sheet used as an anode-leading electrode 7 was welded and secured to the metal surface portion 6 at the other end portion of the capacitor. Moreover, the entire electrolytic capacitor provided with the nickel sheet used as the anode-leading electrode 7 and the nickel sheet used as the cathode-leading electrode 8 was molded of an epoxy resin (not shown). Both end portions thereof was ground in the end, whereby the surface of the nickel sheet used as the anode-leading electrode 7 and the surface of the nickel sheet used as the cathode-leading electrode 8 were exposed so that the electrolytic capacitor was obtained as a capacitor element.

EXAMPLE 2

In this example, an anode valve metal foil 1 was first obtained by following the same steps as the steps (a), (b) and (c) for the above-mentioned example 1.

(d) A cathode-side conductive polymer layer 5 was formed on one side of the of the anode valve metal foil 1, except for the metal surface portion 6, as described below. First, a nickel sheet measuring 10 mm in width, 20 mm in length and 50 $\mu$m in thickness was prepared as part of an electrolyzing electrode 9a.

A polypyrrole layer measuring 5 mm in width, 9 mm in length and 20 $\mu$m in thickness was formed as a cathode-side conductive polymer layer 5, on one side surface of this nickel sheet by the electrolytically oxidative polymerization technique.

The valve metal foil made of aluminum was disposed on the polypyrrole layer formed on the surface of the nickel sheet so that the metal surface portion 6 does not make contact with the polypyrrole layer. The foil was temporarily attached under pressure by applying a pressure of 10 kg/cm$^2$ using a press, whereby a sample shown in FIG. 7A was obtained.

(e) The sample was subjected to electrolytic polymerization in the monomer solution 11, prepared in the same way as the example 1, to form an electrolytically-formed conductive polymer layer. The above-mentioned sample was immersed in this monomer solution 11. As shown in FIGS. 7B and 8A, a nickel sheet measuring 10 mm in width, 20 mm in length and 50 $\mu$m in thickness was disposed as another electrolyzing electrode 9b so as to face the sample with a distance of 1 cm thereto.

A polypyrrole layer was formed as a electrolytically-formed conductive polymer layer 4 by polymerization (the electrolytically oxidative polymerization technique), wherein the nickel sheet, used as the electrolyzing electrode 9a to which the sample was temporarily attached under pressure, was used as positive electrolyzing electrode 9a, and a voltage of 10 V was applied for 10 minutes.

Figure 16:
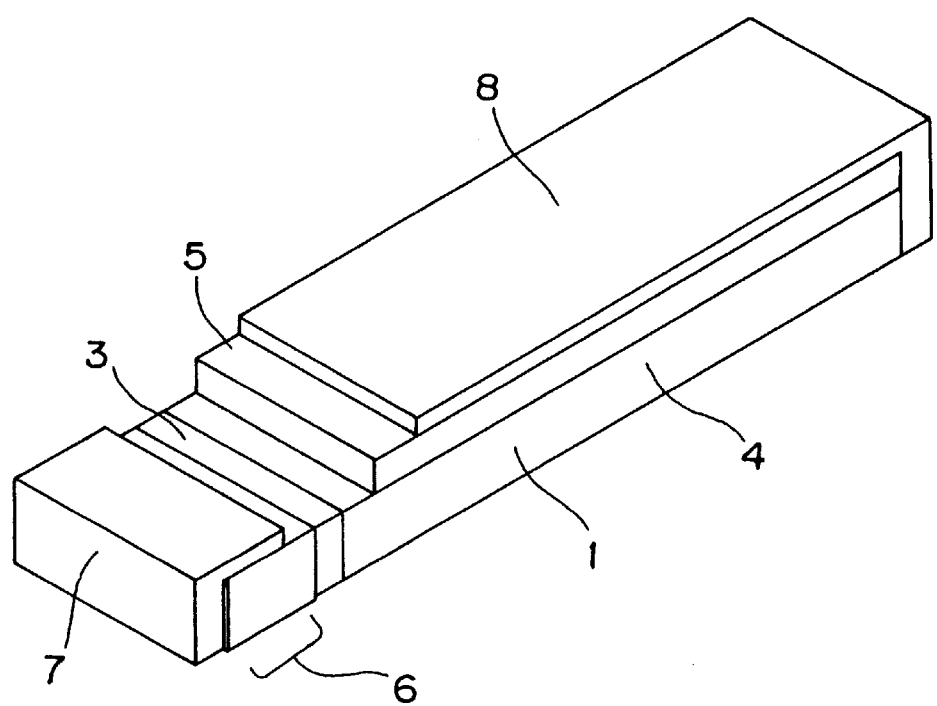
FIG. 16 is a schematic perspective view showing an electrolytic capacitor according to the embodiment of the present invention.

(f) On the polypyrrole layer used as the cathode-side conductive polymer layer 5 of the electrolytic capacitor obtained by following the above-mentioned steps, an L-shaped nickel sheet used as a cathode-leading electrode 8 was bonded and secured to the end portion of the electrolytic capacitor by using a conductive adhesive (not shown) including carbon and silver paste (not shown) as shown in FIG. 16. Furthermore, an L-shaped nickel sheet used as an anode-leading electrode 7 was welded and secured to the metal surface portion 6 at the other end portion of the capacitor. Moreover, the entire electrolytic capacitor provided with the nickel sheet used as the anode-leading electrode 7 and the nickel sheet used as the cathode-leading electrode 8 was molded of an epoxy resin (not shown). Both end portions thereof was ground in the end, whereby the surface of the nickel sheet used as the anode-leading electrode 7 and the surface of the nickel sheet used as the cathode-leading electrode 8 were exposed so that the electrolytic capacitor was obtained as a capacitor element.

EXAMPLE 3

In this example, the anode valve metal foil 1 of the above-mentioned example 1 was used first.

(d) A cathode-side conductive polymer layer 5 was formed on one side of the of the anode valve metal foil 1, except for the metal surface portion 6, as described below. A nickel foil measuring 5 mm in width, 20 mm in length and 30 $\mu$m in thickness was used as a cathode electric collector 13. A polypyrrole layer measuring 5 mm in width, 9 mm in length and 20 $\mu$m in thickness was formed as a cathode-side conductive polymer layer 5 on one side surface of the nickel foil by the electrolytically oxidative polymerization technique.

On this polypyrrole layer formed on the surface of the nickel foil, an aluminum foil used as the above-mentioned anode valve metal foil 1 was disposed just like the example 2. The foil was temporarily attached under pressure by applying the same pressure as that for the example 2 using a press, whereby a sample shown in FIG. 11A was obtained.

(e) Next, the step of forming an electrolytically-formed conductive polymer layer electrically connected to the cathode-side conductive polymer layer 5 on the dielectric layer of the oxide film 3 is described below. The above-mentioned sample was immersed in this monomer solution 11 adjusted for the example 1. As shown in FIGS. 11B and 12, a nickel sheet measuring 10 mm in width, 20 mm in length and 50 µm in thickness was disposed as another electrode 9 so as to face the sample with a distance of 1 cm thereto. A polypyrrole layer was formed by electrolytic polymerization just as described above. Paint for preventing excess polymerization of the polypyrrole was then removed, thereby obtaining an electrolytic capacitor having the structure shown in FIG. 9.

Figure 17:
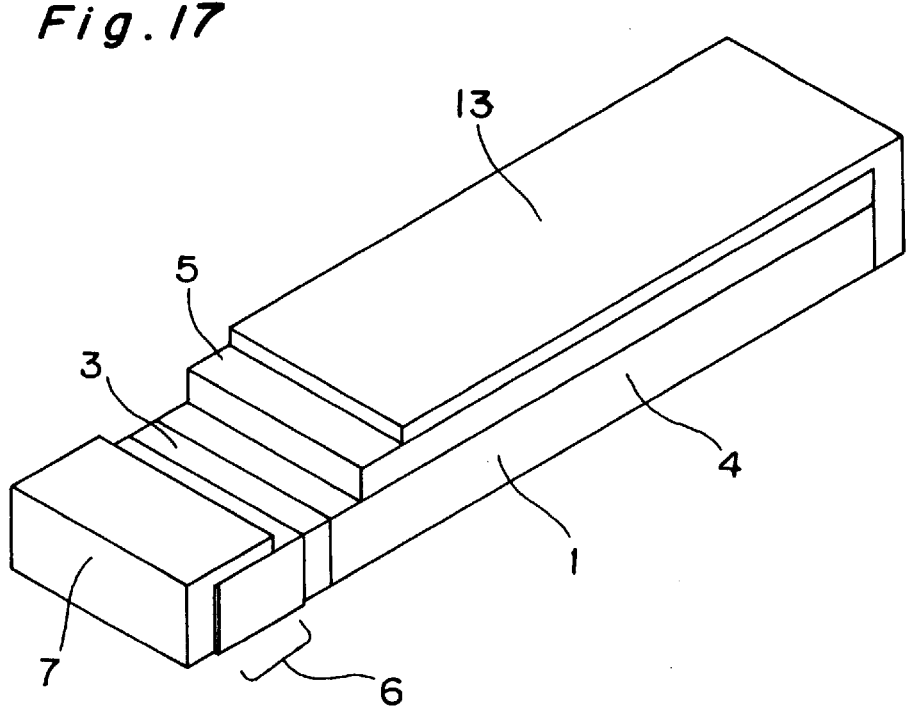
FIG. 17 is a schematic perspective view showing an electrolytic capacitor according to the embodiment of the present invention.

(f) The cathode electric collector 13 of the electrolytic capacitor obtained by following the above-mentioned steps was bent in the shape of L, and its excess portions were cut off. Furthermore, an L-shaped nickel sheet used as an anode-leading electrode 7 was welded and secured to the metal surface portion 6 at the other end portion of the capacitor, and an electrolytic capacitor shown in FIG. 17 was obtained. Moreover, the entire electrolytic capacitor provided with the nickel sheet used as the anode-leading electrode 7 and the nickel foil used as the cathode-leading electrode 13 was molded of an epoxy resin (not shown). Both end portions thereof was ground in the end, whereby the surface of the nickel sheet used as the anode-leading electrode 7 and the surface of the nickel foil used as the cathode-leading electrode 13 were exposed so that the electrolytic capacitor was obtained as a capacitor element.

EXAMPLES 4 to 6

Examples 4, 5 and 6 described below are the same as the above-mentioned examples 1 to 3 in structure and production method, except that a manganese dioxide layer (not shown) used as a conductive layer was directly formed on the oxide film before the step of forming the electrolytically-formed conductive polymer layer 4 by the electrolytically oxidative polymerization technique. In other words, the capacitor elements of the examples 4 to 6 differ from the capacitor elements of the above-mentioned examples 1 to 3 in that the electrolytically-formed conductive polymer layer is formed by the electrolytically oxidative polymerization technique on the conductive layer formed previously.

In each example, the conductive layer was formed as described below.

The anode valve metal foil at the steps (a) to (c) in the above-mentioned example 1 was immersed in manganese nitrate for five minutes, and then subjected to heat treatment at 250° C. for 10 minutes. As a result, the manganese nitrate was subjected to thermal decomposition, and a manganese dioxide layer (not shown) was formed on the dielectric layer of the oxide film 3.

After the conductive layer was formed, the same steps as those for the examples 1, 2 and 3, except for the above-mentioned step of forming the conductive layer, were carried out to produce capacitor elements, and these were obtained as the examples 4, 5 and 6, respectively.

Comparison (a) A step of preparing the anode valve metal foil having a coarsened surface is described below. An aluminum foil (a soft material) having a purity of 99.98% or more and measuring 100 µm in thickness, 5 mm in width and 13 mm in length was prepared. By the same step as the step (a) for the example 1, except for the provision of the through holes 20, the surface of the foil was coarsened, and then anodized to obtain an anode valve metal foil. The foil capacitance of the entire dielectric oxide film of the obtained aluminum foil was measured according to the same measurement method as for the above-mentioned example 1. As the result of the measurement, the foil capacitance was 28.4 µF (at 10 Hz).

(d) On the surface of the aluminum oxide on the aluminum foil having no through holes 20, used as the anode valve metal foil obtained by the above-mentioned step, a manganese dioxide layer was formed by thermally decomposing manganese nitrate, and the manganese dioxide layer was used as an electrode. More specifically, the aluminum foil was immersed in manganese nitrate for five minutes, and then subjected to heat treatment at 250° C. for 10 minutes. As a result, the manganese nitrate was subjected to thermal decomposition, and a manganese dioxide layer (not shown) was formed on the dielectric layer of the oxide film 3.

Furthermore, a cathode-side conductive polymer layer was formed by using the above-mentioned monomer solution in accordance with the same method as that for the example 1. The aluminum foil on which the above-mentioned manganese dioxide was formed was immersed in the monomer solution 11. A nickel sheet measuring 10 mm in width, 20 mm in length and 50 µm in thickness was disposed as an electrode 9 so as to face the aluminum foil with a distance of 1 cm thereto. Next, the temperature of the monomer solution 11 was adjusted at 20° C. A polypyrrole layer was then formed by polymerization (the electrolytically oxidative polymerization technique) by using the side of the manganese dioxide layer as the positive electrolyzing electrode 9a, and by applying a voltage of 10 V for 10 minutes just like the above-mentioned example 1.

(e) To the electrolytic capacitor obtained by following the above-mentioned steps, a nickel sheet used as an anode-leading electrode and a nickel sheet used as a cathode-leading electrode are secured in the same method as for the example 1 (f). The entire electrolytic capacitor was molded of an epoxy resin, and both end portions thereof was ground, whereby the electrolytic capacitor was obtained as a capacitor element.

Ten electrolytic capacitors were obtained for each of the examples 1 to 6 and a comparison example, and the capacitances of these electrolytic capacitors (hereinafter referred to as element capacitances) were measured. Table 1 shows the results of the measurement. Each value in the table is the average for the ten measurement samples of each example.

TABLE 1

| | capacitance µF | | |
|---|---|---|---|
| Example | designed from foil | capacitor | attainment ratio (%) |
| 1 | 28.2 | 24.5 | 86.9 |
| 2 | 28.2 | 24.8 | 87.9 |
| 3 | 28.2 | 24.7 | 87.6 |
| 4 | 28.2 | 25.8 | 91.5 |
| 5 | 28.2 | 26.2 | 92.9 |
| 6 | 28.2 | 26.1 | 92.6 |
| Comparison | 28.2 | 15.2 | 53.5 |

As clearly shown in Table 1, the electrolytic capacitors of the examples 1 to 6 in accordance with the present invention are superior to the aluminum solid electrolytic capacitor of the comparison example obtained in accordance with the conventional method in terms of the design capacitance attainment ratio.

The capacitance attainment ratio of the comparison example is significantly low. It is assumed that this low ratio is caused because the formation of the polypyrrole as a conductive polymer by the electrolytically oxidative polymerization technique is not carried out sufficiently in 10 minutes.

On the other hand, in the case of the example 1, the electrolytically-formed conductive polymer layer was able to be formed integrally and continuously, mainly in the direction of the thickness of the anode valve metal foil, simultaneously starting from the electrolyzing electrode disposed on one side surface of the anode valve metal foil. As a result, it is assumed that the conductive polymer lay was able to be formed in a shorter time (ten minutes in total in the example 1) in comparison with the conventional method, whereby a sufficiently high capacitance attainment ratio was able to be obtained.

Furthermore, in the case of the examples 2 and 3 in accordance with the present invention, the electrolytically-formed conductive polymer layer was also able to be formed integrally and continuously, mainly in the direction of the thickness of the anode valve metal foil, simultaneously starting from the cathode-side conductive polymer layer formed or disposed on one side surface of the anode valve metal foil. As a result, it is assumed that the conductive polymer lay was able to be formed in a shorter time (ten minutes in total in example 1) in comparison with the conventional method, whereby a sufficiently high capacitance attainment ratio was able to be obtained.

In addition, the examples 4 to 6 in accordance with the present invention are superior to the examples 1 to 3 in accordance with the present invention in terms of the capacitance attainment ratio. This superiority of the examples 3 to 6 may be because, in addition to the effects in the above-mentioned examples 1 to 3, by previously forming the conductive layer, the dielectric layer of the oxide film was covered more completely with the electrolytically-formed conductive polymer layer formed in the same polymerization time (10 minutes in the case of the present example). In other words, it is assumed that more efficient production can be attained by forming the conductive layer on the oxide film.

EXAMPLE 7

An electrolytic capacitor was produced in accordance with the same steps as the steps (a) to (d) of the example 2. The foil capacitance of the aluminum foil used for the electrolytic capacitor was 28.2 $\mu$F when measured at 10 Hz in the aqueous solution of ammonium borate having a conductivity of 50 mS/cm just as measured in the same way.

(f) Next, as a step of laminating plural electrolytic capacitor units, four electrolytic capacitor units, obtained by following the above-mentioned steps in sequence, were laminated, with the orientations of the capacitor units aligned, as shown in FIG. 13.

(g) Next, as a step of integrating the metal surface portions of the anode valve metal foils, the metal surface portions 6 of the electrolytic capacitor units were made joined and integrated with a nickel sheet used as an anode-leading electrode 7 by welding.

Figure 18:
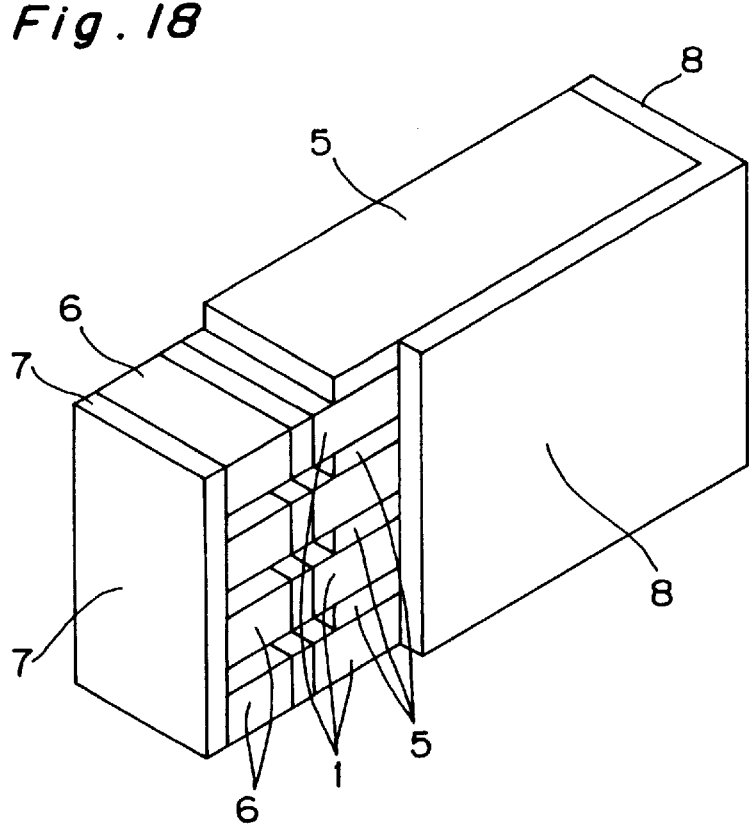
FIG. 18 is a schematic perspective view showing a laminated electrolytic capacitor according to the embodiment of the present invention.

(h) Next, a step of integrating the cathode-side conductive polymer layers is described below. On the polypyrrole layers used as the cathode-side conductive polymer layers 5 of the electrolytic capacitor units, an L-shaped nickel sheet used as a cathode-leading electrode 8 was bonded and secured to the end portions of the electrolytic capacitor units by using a conductive adhesive (not shown) including carbon and silver paste (not shown) as shown in FIG. 18. Furthermore, a nickel sheet used as an anode-leading electrode 7 was secured to the metal surface portions 6 at the other end portions of the capacitor units.

Finally, the entire electrolytic capacitor provided with the nickel sheet used as the anode-leading electrode 7 and the nickel sheet used as the cathode-leading electrode 8 was molded of an epoxy resin (not shown). Both end portions thereof was ground in the end, whereby the surface of the nickel sheet used as the anode-leading electrode 7 and the surface of the nickel sheet used as the cathode-leading electrode 8 were exposed so that the electrolytic capacitor was obtained as a capacitor element.

The capacitance (hereinafter referred to as an "element capacitance") of the electrolytic capacitor obtained by the above-mentioned steps was evaluated as described below. Table 2 shows the results of the measurement of the capacitance. Each value in the table is the average for the ten measurement samples of the example. In addition, the above-mentioned foil capacitance (28.2 $\mu$F) multiplied by four (the capacitance of the four electrolytic capacitor units) is entered in the foil capacitance column of the table.

TABLE 2

| | capacitance $\mu$F | | |
| Example | designed from foil | capacitor | attainment ratio (%) |
| --- | --- | --- | --- |
| 7 | 112.8 | 97.2 | 86.2 |

Any significant reduction in capacitance because of the lamination was not recognized as clearly indicated in Table 2. In other words, by laminating and integrating plural capacitor units, each being capable of sufficiently delivering the capacitance of its design value, it is possible to easily obtain an electrolytic capacitor being small in size and large in capacitance.

What is claimed is:

1. An electrolytic capacitor comprising an anode layer of a valve metal foil having through holes and a coarsened surface, a dielectric layer of an oxide film formed by anodizing a part of the surface of the metal foil, and a cathode layer on the dielectric layer,
   wherein the cathode layer is an electrolytically-formed conductive polymer layer formed to make contact with the dielectric layer;
   the cathode layer contains a cathode-side conductive polymer layer which is formed on one side of the anode layer, and the electrolytically-formed conductive polymer layer covers the other side of the anode layer so as to make contact with the dielectric layer of the oxide film and is electrically connected to the cathode-side conductive polymer layer; and
   the capacitor further comprises an electric collector which is a metal foil formed on the one side of the anode layer via the cathode-side conductive polymer layer.

2. The electrolytic capacitor according to claim 1, wherein the valve metal foil is made of aluminum.

3. The electrolytic capacitor according to claim 2, wherein the electrolytically-formed conductive polymer layer contains a heterocyclic 5-member compound.

4. An electrolytic capacitor comprising an anode layer of a valve metal foil having through holes and a coarsened surface, a dielectric layer of an oxide film formed by anodizing a part of the surface of the metal foil, and a cathode layer on the dielectric layer, wherein the cathode layer is an electrolytically-formed conductive polymer layer formed to make contact with the dielectric layer;

the cathode layer includes another conductive layer which is formed so as to make contact with the dielectric layer; and the electrolytically-formed conductive polymer layer is formed on the dielectric layer so as to cover the another conductive layer.

5. A laminated electrolytic capacitor which is a laminate of a plurality of electrolytic capacitors, each capacitor comprising an anode layer of a valve metal foil having through holes and a coarsened surface, a dielectric layer of an oxide film formed by anodizing a part of the surface of the metal foil, and a cathode layer on the dielectric layer, wherein the cathode layer is an electrolytically-formed conductive polymer layer formed to make contact with the dielectric layer; the cathode layer contains a cathode-side conductive polymer layer which is formed on one side of the anode layer, and the electrolytically-formed conductive polymer layer covers the other side of the anode layer so as to make contact with the dielectric layer of the oxide film and is electrically connected to the cathode-side conductive polymer layer;

wherein the electrolytic capacitors are laminated to the laminate such that the cathode layers of the adjacent electrolytic capacitors make contact with each other, and the laminate is provided with an anode-leading electrode electrically connected to the metal surface portion of each valve metal foil and a cathode-leading electrode electrically connected to one or more of the cathode layers of the laminated electrolytic capacitors.

6. The laminated electrolytic capacitor according to claim 5, wherein each of the electrolytic capacitors has an electric collector which is a metal foil formed on the one side of the anode layer via the cathode-side conductive polymer layer, and the cathode-leading is connected to the cathode electrodes.

7. The laminated electrolytic capacitor according to claim 5, wherein the cathode layer includes another conductive layer which is formed so as to make contact with the dielectric layer; and the electrolytically-formed conductive polymer layer is formed on the dielectric layer so as to cover the another conductive layer.

8. A wound electrolytic capacitor which is a coil of an electrolytic capacitor comprising an anode layer of a valve metal foil having through holes and a coarsened surface, a dielectric layer of an oxide film formed by anodizing a part of the surface of the metal foil, and a cathode layer on the dielectric layer, wherein the cathode layer is an electrolytically-formed conductive polymer layer formed to make contact with the dielectric layer; the cathode layer contains a cathode-side conductive polymer layer which is formed on one side of the anode layer, and the electrolytically-formed conductive polymer layer covers the other side of the anode layer so as to make contact with the dielectric layer of the oxide film and is electrically connected to the cathode-side conductive polymer layer, wherein the coil is wound such that the cathode layers of the one side of the electrolytic capacitor make contact with the cathode layers of the other side of the same; and the coil is provided with an anode-leading electrode electrically connected to the metal surface portion of the valve metal foil and a cathode-leading electrode electrically connected to the cathode layers of the wound electrolytic capacitor.

9. The wound electrolytic capacitor according to claim 8, wherein the electrolytic capacitor has an electric collector which is a metal foil formed on the one side of the anode layer via the cathode-side conductive polymer layer, and the cathode-leading electrode is connected to the cathode layers.

10. The wound electrolytic capacitor according to claim 8, wherein the cathode layer includes another conductive layer which is formed so as to make contact with the dielectric layer; and the electrolytically-formed conductive polymer layer is formed on the dielectric layer so as to cover the another conductive layer.

* * * * *